(12) United States Patent
Soda

(10) Patent No.: US 7,912,340 B2
(45) Date of Patent: Mar. 22, 2011

(54) DATA PROCESSING APPARATUS

(75) Inventor: Atsumu Soda, Tokyo (JP)

(73) Assignee: Sony Corporation, Tokyo (JP)

( * ) Notice: Subject to any disclaimer, the term of this patent is extended or adjusted under 35 U.S.C. 154(b) by 1044 days.

(21) Appl. No.: 10/342,048

(22) Filed: Jan. 14, 2003

(65) Prior Publication Data

US 2003/0133696 A1     Jul. 17, 2003

(30) Foreign Application Priority Data

Jan. 15, 2002    (JP) ................ P2002-006402

(51) Int. Cl.
*H04N 5/935*     (2006.01)
*H04N 5/931*     (2006.01)
*H04N 5/932*     (2006.01)
*H04N 5/76*     (2006.01)
*H04N 9/80*     (2006.01)

(52) U.S. Cl. ........ 386/205; 386/206; 386/221; 386/237; 386/252

(58) Field of Classification Search .............. 386/68, 386/110, 46, 95, 125–126, 205, 206, 221, 386/237, 252
See application file for complete search history.

(56) References Cited

U.S. PATENT DOCUMENTS

| | | | |
|---|---|---|---|
| 4,224,644 A * | 9/1980 | Lewis et al. | 360/72.2 |
| 5,282,049 A | 1/1994 | Hatakenaka et al. | |
| 5,377,051 A * | 12/1994 | Lane et al. | 386/81 |
| 5,583,653 A * | 12/1996 | Timmermans | 386/125 |
| 5,596,420 A * | 1/1997 | Daum | 386/110 |
| 6,009,236 A * | 12/1999 | Mishima et al. | 386/111 |
| 6,064,794 A * | 5/2000 | McLaren et al. | 386/68 |
| 6,871,006 B1 * | 3/2005 | Oguz et al. | 386/68 |

FOREIGN PATENT DOCUMENTS

| | | |
|---|---|---|
| EP | 1 187 475 | 3/2002 |
| JP | 6 339113 | 12/1994 |
| JP | 8 154230 | 6/1996 |
| JP | 11 134814 | 5/1999 |
| JP | 2000-287162 | 10/2000 |
| JP | 2001 69464 | 3/2001 |
| JP | 2001 291342 | 10/2001 |
| JP | 2001 352524 | 12/2001 |
| WO | WO 99 45708 | 9/1999 |

OTHER PUBLICATIONS

Patent Abstracts of Japan 07-203373, published on Aug. 4, 1995.
Patent Abstracts of Japan 08-163494, published on Jun. 21, 1996.

* cited by examiner

*Primary Examiner* — Thai Tran
*Assistant Examiner* — Daquan Zhao
(74) *Attorney, Agent, or Firm* — Frommer Lawrence & Haug LLP; William S. Frommer; Paul A. Levy

(57) ABSTRACT

A high speed data processing apparatus which is able to produce smooth reproduced pictures without lowering the quality of the reproduced picture. When the high speed reproduction is selected by a user, a system controller controls a media controller to cause a reproducing driver to read out a plural number of stamp video data from an optical disc to write the data in an associated memory space of the memory on the frame basis. The data processing apparatus reads out stamp video data written on the frame basis in a memory space of the memory portion-wise to display the plural number of frames of the picture information simultaneously on one picture frame in each output frame.

8 Claims, 27 Drawing Sheets

|   | 1 | 2 | 3 | 4 | 5 |
|---|---|---|---|---|---|
| F 0 | P 1 |  |  |  |  |
| F 1 |  | P 2 |  |  |  |
| F 2 |  |  | P 3 |  |  |
| F 3 |  |  |  | P 4 |  |
| F 4 |  |  |  |  | P 5 |

FIG. 12

|    | 1   | 2   | 3   | 4   | 5   |
|----|-----|-----|-----|-----|-----|
| F0 | P1  |     |     |     |     |
| F1 |     | P2  |     |     |     |
| F2 |     |     | P3  |     |     |
| F3 |     |     |     | P4  |     |
| F4 |     |     |     |     | P5  |
| F5 | P6  |     |     |     |     |
| F6 |     | P7  |     |     |     |
| F7 |     |     | P8  |     |     |

FIG. 14

|  | 1 | 2 | 3 | 4 | 5 |
|---|---|---|---|---|---|
| F0 | P1 | P7 | P13 | P19 | P25 |
| F1 | P26 | P2 | P8 | P14 | P20 |
| F2 | P21 | P27 | P3 | P9 | P15 |
| F3 | P16 | P22 | P28 | P4 | P10 |
| F4 | P11 | P17 | P23 | P29 | P5 |
| F5 | P6 | P12 | P18 | P24 | P30 |

FIG. 16

DATA PROCESSING APPARATUS

BACKGROUND OF THE INVENTION

1. Field of the Invention

The present invention relates to a data processing apparatus in which data is reproduced from a non-linear accessible recording medium having recorded thereon both high rate data and low rate data for the same material. This application claims priority of Japanese Patent Application No.2002-006402, filed on Jan. 15, 2002, the entirety of which is incorporated by reference herein.

2. Description of Related Art

In high-speed reproduction of a picture recorded on a non-linear accessible recording medium, such as optical discs, magnetic discs or a semiconductor memories, it is customary to reproduce frame-skipped pictures. Thus, in reproducing at a 50-tupled speed, pictures are updated every 50 frames, such that 49 frames in-between are skipped. For example, if pictures are recorded by a compression system employing correlation along time axis, such as MPEG2 (Moving Picture Experts Group-2), it occurs from time to time that the information on the forward side GOP (Group of Picture) and on the rear side GOP is required for decoding. The result is that limitations by the decoder processing speed are imposed on the number of frames that can be decoded at the time of high speed reproduction such that the frame-skipping interval is not constant instantaneously and hence the reproduced picture is jerky for the same skipping rate.

In case of high-speed reproduction on the aforementioned non-linear recording medium, non-jerky reproduced pictures, such as those obtained on high-speed reproduction of the conventional analog VTR, for example, are desired. This, however, has been difficult in case the pictures have been compressed in accordance with a compression system employing the correlation along time axis such as that described above.

On the other hand, in high-speed reproduction of the analog video information, the audio information related to the video information is also reproduced at a high speed, such that speech-based scene retrieval is also possible. In high-speed reproduction of the audio information recorded on the non-linear recording medium, however, reproduced audio data tends to be discrete or to become constant in the sound interval irrespective of the reproducing speed in a manner distinct from the case where the audio signals are recorded on a longitudinal track with high frequency bias recording as in the case of analog VTR.

SUMMARY OF THE INVENTION

In view of the above-depicted status of the art, it is an object of the present invention to provide a data processing apparatus whereby smooth reproduced pictures may be obtained in case of high speed reproduction of video data from a non-linear medium, such as optical discs, magnetic discs or semiconductor memories.

The present invention provides a data processing apparatus including a reader for reading data recorded on a non-linear accessible recording medium having recorded thereon video data including high rate video data and low rate video data for the same material, and an output data generator which, at the time of high speed reproduction, causes the reader to read out the low rate video data from the recording medium, forms respective frames of output video data so that a predetermined plural number of the low rate video data are displayed at least portion-wise in one and the same frame, and which updates the respective frames of the output video data portion-wise with the low rate video data read out by the reader for each frame of the output video data.

BRIEF DESCRIPTION OF THE DRAWINGS

FIG. 12 illustrates readout of stamp video data from a memory space during high speed reproduction.

FIG. 14 illustrates readout of stamp video data from a memory space during high speed reproduction.

FIG. 16 illustrates readout of stamp video data from a memory space during high speed reproduction.

DESCRIPTION OF THE PREFERRED EMBODIMENTS

Figure 1:
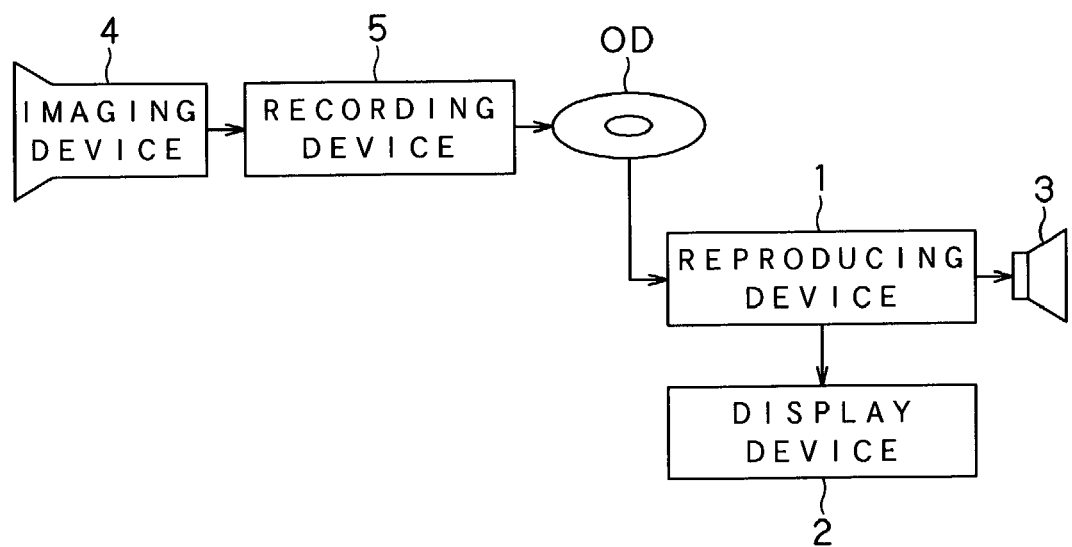
FIG. 1 is a block diagram showing an instance of application of a data reproducing device as a first embodiment of the present invention.

Referring to the drawings, certain preferred embodiments of the present invention will be explained in detail. A first embodiment is directed to a data reproducing device 1, which is adapted for reproducing data from an optical disc, in whose distinct areas high rate data and low rate data for the same material have been recorded, and which, at the time of high-speed reproduction, portion-wise updates the display on a picture frame with low-rate data reproducible within a reproducing rate. The high-rate data and low-rate data for the same material mean high resolution data and low resolution data, respectively, insofar as video data are concerned. It is noted that both the high-rate data and the low-rate data are video data.

To the data reproducing device 1 are connected a display device 2 and a loudspeaker 3, as shown in FIG. 1. In particular, the data reproducing device 1 demonstrates several frames of the picture information in discrete fashion on a picture frame of a display device 2 at the time of high-speed reproduction, or outputs at a loudspeaker the high sound range noise or the sound shifted to the high sound range, which may be defined as being the sound the interval of which has been changed to conform to or follow up with the reproducing speed or the sound.

This discrete demonstration of several frames of the picture information, or the high rang noise sound conforming to the reproducing speed, which is possible conventionally with analog reproduction with e.g., an analog VTR, is difficult with the digital reproduction employing the digital VTR.

On an optical disc OD, reproduced by the data reproducing device 1, there are recorded high resolution (high rate) video data and low resolution (low rate) video data, imaged by an image pick-up device 4 and subsequently generated by a data recording device 5. On the optical disc OD, there are also recorded high sampling rate (high rate) audio data and low sampling rate (low rate) audio data, which have been collected in association with the picture by a microphone mounted on the image pick-up device 4 and which subsequently have been generated by the data recording device 5. Meanwhile, the speech related to the picture may also be collected by a microphone used by itself, that is, not unified to an image pick-up device, or by a microphone held by an interviewer, so as to be then recorded by the data recording device 5.

Before proceeding to description of the data reproducing device 1, the image pick-up device 4 and the data recording device 5, used for recording high rate data and low rate data, pertinent to pictures and speech, on the optical disc OD, are hereinafter explained.

The image pick-up device 4 includes e.g., a CCD image sensor, for taking a picture of an object transmitted through an optical lens for generating image pickup signals, and a camera signal processing circuit for performing camera signal processing on the image pickup signals. The image pickup device is not limited to the image pickup device employing a CCD image sensor, but may also be an image pickup device employing other sorts of image sensors.

Figure 2:
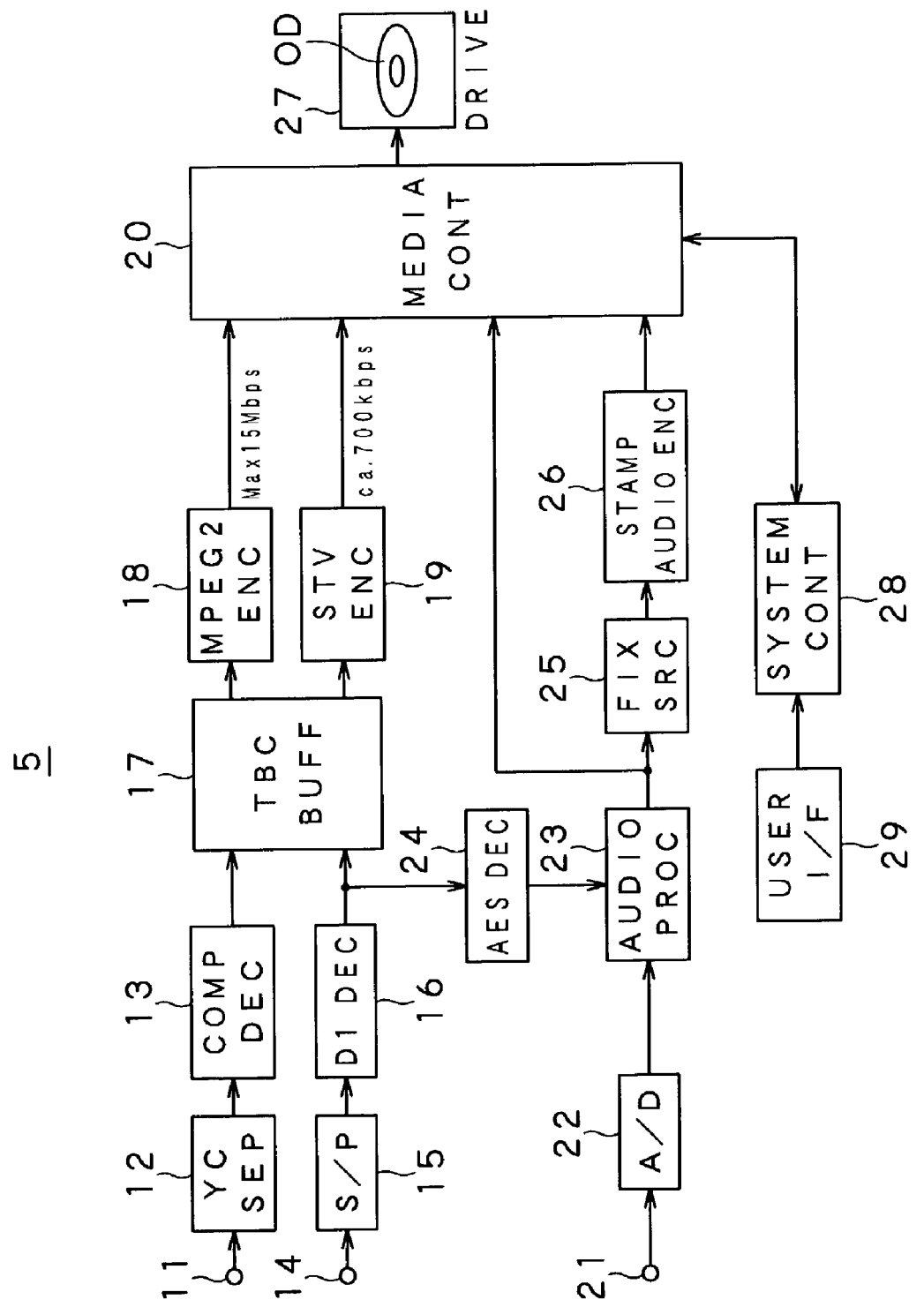
FIG. 2 is a block diagram showing a structure of a data recording device for recording data on an optical disc.

Referring to FIG. 2, the data recording device 5 separates composite picture signals, supplied via an input terminal 11 from the image pick-up device 4, into luminance signals Y and chroma signals C, which signals Y and C are further converted by a component decoder (Comp DEC) 13 into 4:2:2 baseband component data Y, Cb and Cr.

Moreover, the data recording device 5 converts video data of the D1 format, which is based on non-compressed serial digital interface (SDI, SMPTE 259M), supplied via input terminal 14 from the image pick-up device 4, into parallel data by a serial/parallel (S/P) converting circuit 15, and subjects the so produced parallel data to error correction etc. and to decode by a D1 decoder (DEC) 16 to convert the data into 4:2:2 baseband component video data Y, Cb and Cr.

A time base corrector 17 of the data recording device 5 adjusts the time axis of baseband component video data Y, Cb and Cr from the component decoder 13 or baseband component video data Y, Cb and Cr from the D1 decoder 16. The baseband component video data, the time axis of which has been adjusted by the time base corrector 17, are sent to an MPEG2 (Moving Picture Experts Group-2) encoder (ENC) 18, generating the high rate video data, and to a stamp video encoder (Stamp Video: STV-ENC) 19, generating the low rate video data. Of course, the high rate video data encoder may be other MPEG encoders or other sorts of the high resolution video data generating device. Moreover, the stamp video encoder 19 may be of any suitable encoding systems.

The MPEG2 encoder 18 performs compression processing employing correlation along the time axis, such as motion compensation prediction, DCT, quantization or variable length coding, on the baseband component video data, to generate high resolution MPEG2 video data usable for broadcast, such as MPEG2MP@ML (Main Profit/Main Level) profile data. These MPEG2 video data are transmitted to a next stage media controller (MEDIA CONT) at a high rate of 15 Mbps at the maximum. Of course, MPEG2MP@ML (Main Profit/High Level) profile data may also be generated.

The stamp video encoder 19 performs the processing of changing the number of pixels or intra-frame compression processing on the baseband component video data, that is the component video data from the same source (same material) as that input to the MPEG2 encoder 18, without employing correlation along the time axis, to lower the data volume, to generate the stamp video data of a lower rate than that of the MPEG2 video data. These stamp video data are the video data lower in resolution than that of the MPEG2 video data, and is transmitted to the next stage media controller (MEDIA CONT) 20 at a lower rate of approximately 700 kbps. Although the stamp video data is of a low rate and of low resolution, the data volume transmitted per unit time is larger than that of the high rate MPEG2 video data. Meanwhile, the stamp video data may be those obtained on inter-frame compression.

The data recording device 5 converts the speech, supplied from a microphone via input terminal 21, into digital data by an analog/digital converter (A/D) 22, to process the resulting digital data with sampling at a high sampling rate of the sampling frequency Fs of, for example, 48 kHz, by an audio process controller (AUDIO PROC) 23, to generate high sound quality digital audio data (high rate audio data) which is then routed to the media controller 20. It should be noted that, if the digital audio data is pertinent to the baseband component video data from the D1 decoder 16, an AES decoder 24 is provided between the audio process controller 23 and the D1 decoder 16, because it is necessary to interchange e.g., the channels in accordance with the AES (Advanced Encryption Standard).

Moreover, the present data recording device 5 converts the high sound quality digital audio data (sampling frequency Fs=48 kHz) by a fixed sampling rate converter (FIX SRC) 25 into low sound quality digital audio data of the sampling frequency Fs=8 kHz, and subsequently encodes the so produced low sound quality digital audio data with a fixed compression ratio, such as by log compression, by a stamp audio encoder (Stamp Audio Enc) 26, to route the resulting data to the media controller 20 as stamp audio data (low rate audio data).

The media controller 20 appends the error detection code to or performs writing processing on the MPEG2 video data, high sound quality digital audio data, stamp video data and on the stamp audio data, to convert the data into data suited to recording on the optical disc OD, to route the so produced data to a recording driver 27.

Figure 3:
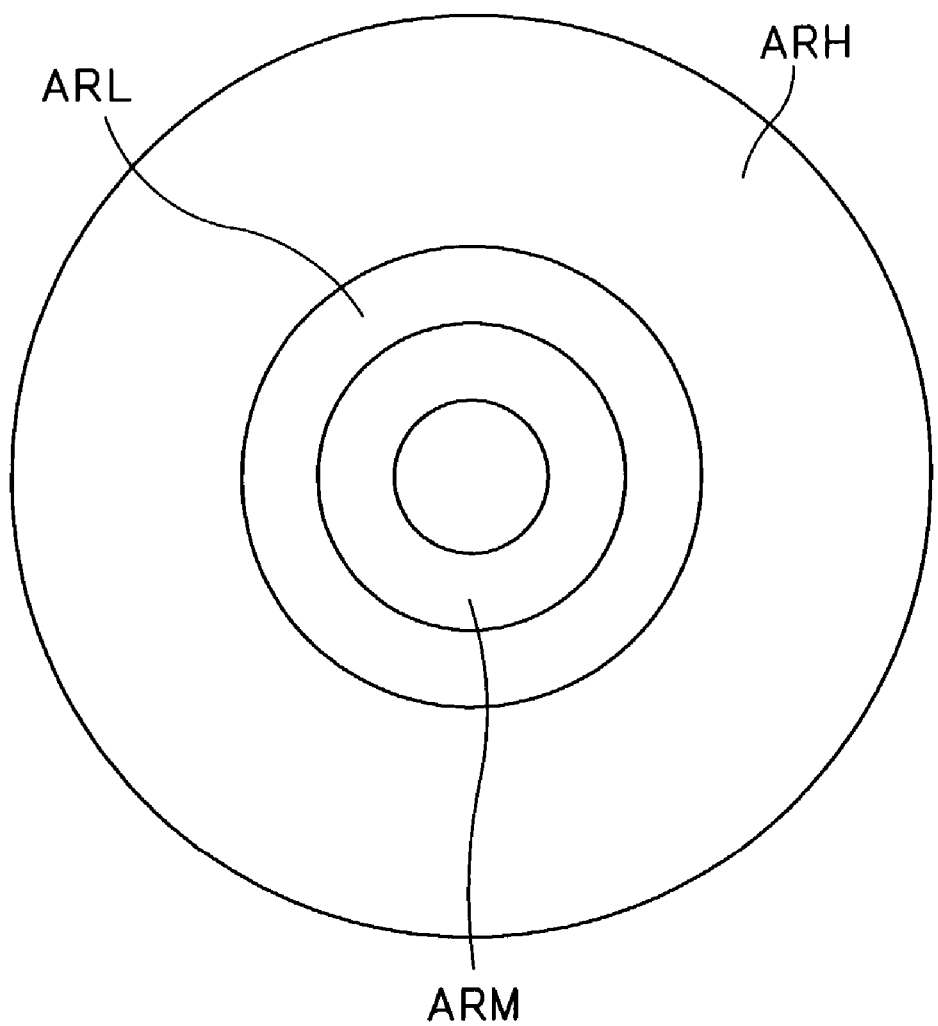
FIG. 3 shows each recording area of an optical disc on which data has been recorded by the data recording device.

The recording driver 27 is made up by an optical head for illuminating the laser light radiated from a semiconductor to an optical disc via optical components, such as various lenses or beam splitters, or an objective lens, for recording data thereon, a sled mechanism for causing movement of the optical head along the radius of the optical disc, a servo system for controlling the focussing or tracking of the objective lens, a recording data modulating system for modulating the laser light in dependence upon the various data for recording, a system for monitoring the recording laser light and a driving system for rotationally driving the optical disc. Referring to FIG. 3, the recording driver 27 records MPEG2 video data and high sound quality digital audio in a high quality recording area ARH on the outermost rim of the optical disc OD, while recording stamp video data and stamp audio data on a low quality recording area ARL on the innermost rim of the optical disc OD. In an innermost rim side management area ARM of the optical disc OD, there are stored the disc management information and the system information. It should be noted that the recording areas described above are merely illustrative and are not intended for limiting the scope of the invention.

A system controller (System CONT) 28 controls the media controller 20, responsive to a user command from a user interface (User I/F) 29, to control the operation of recording the MPEG2 video data, high quality digital audio data, stamp video data, disc management information or the system information, on the optical disc.

The essential portions of the data recording device 5, that is the vicinity of the video data encoder and the audio data encoder, specifically, the MPEG2 encoder 18, stamp video encoder 19, audio process controller 23, FIX SRC 25 and the stamp audio encoder 26, are hereinafter explained in detail.

Figure 4:
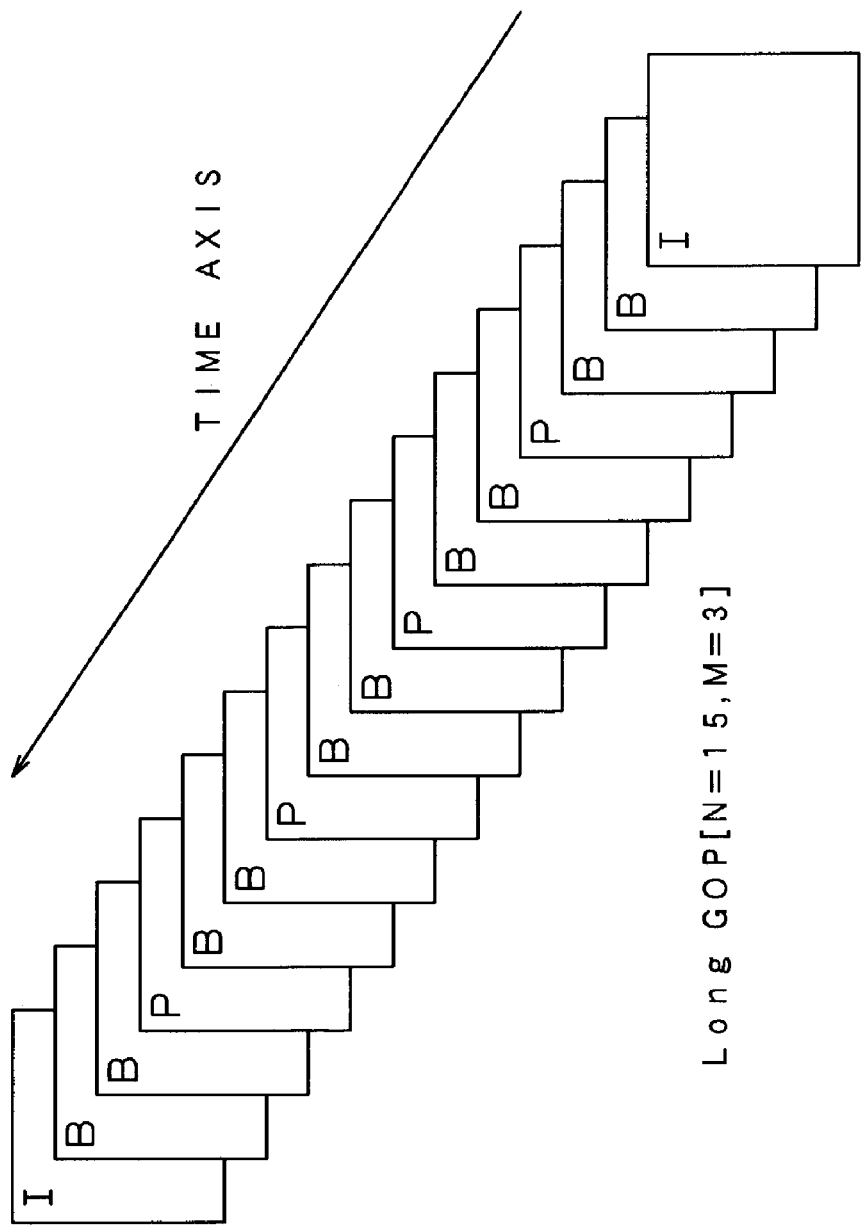
FIG. 4 shows a GOP structure of MPEG2 data.

The MPEG2 encoder 18 removes redundancy along the time axis by motion compensation prediction, using correlation along time axis, to compress the 4:2:2 baseband component video data Y, Cb and Cr. The MPEG2 encoder 18 compression-encodes the video information using an intra-frame encoded picture or an 1-picture, encoded within a frame, an inter-frame forward predictive-coded picture or a P-picture, encoded by predicting the current picture from the past picture, and a bidirectional prediction-coded picture or a B-picture, encoded by predicting the current picture from both the past and future pictures. A set of pictures including one I-picture is termed a GOP (Group of Pictures). FIG. 4 shows a GOP structure with the number of pictures therein of 15 and the period M of appearance of I and P pictures of 3. A picture sequence of IBBPBBPBBPBBPBB is allocated along the time axis. This GOP structure is hereinafter termed a long GOP.

Figure 5:
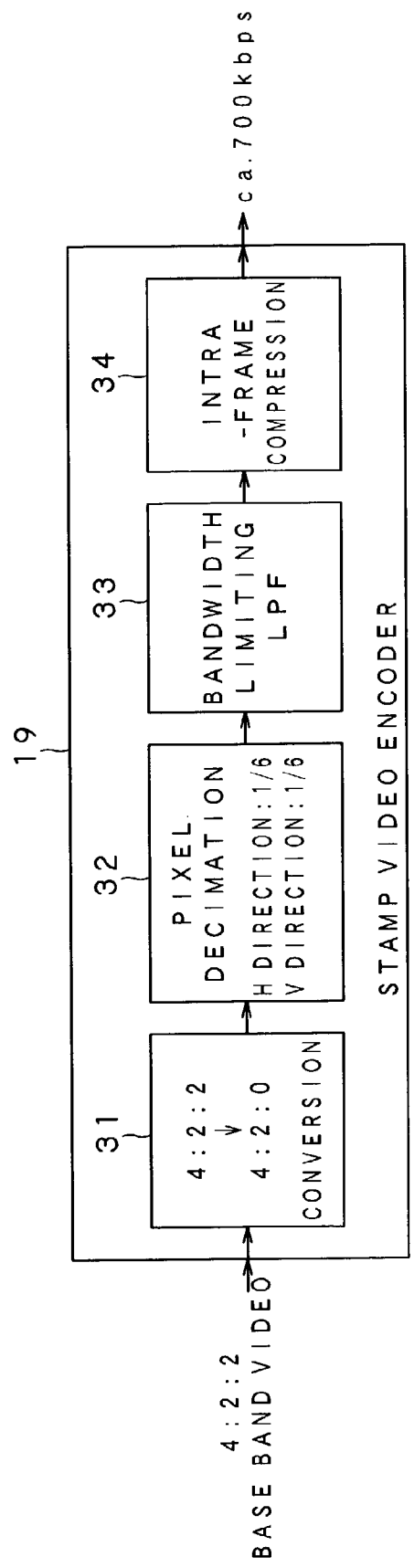
FIG. 5 is a block diagram showing a detailed structure of a stamp video encoder as an essential portion of the data recording device.

The stamp video encoder 19 generates data lower in resolution than the MPEG2 video data by processing the 4:2:2 baseband component video data Y, Cb and Cr, using the structure shown in FIG. 5. This yields stamp video data as low rate video data. The stamp video encoder 19 is made up by a 4:2:2 to 4:2:0 converter 31, a pixel decimation unit 32, a bandwidth limiting LPF 33 and an intra-frame compression unit 34. The 4:2:2 to 4:2:0 converter 31 converts the sampling frequency ratio 4:2:2 of the luminance information Y and the chroma information Cr, Cb of the baseband component video data to 4:2:0. While 4:2:2 halves the chroma information Cb, Cr in the horizontal direction, the 4:2:2 to 4:2:0 converter 31 further halves the chroma information Cb, Cr in the horizontal or vertical directions. The pixel decimation unit 32 decimates the pixels by for example one-sixth in the horizontal direction and by for example one-sixth in the vertical direction. The bandwidth limiting filter (LPF) 33 removes the high frequency component of the decimated 4:2:0 component video data to then send the resulting data to the intra-frame compression unit 34. The intra-frame compression unit 34 further compresses the bandwidth-limited 4:2:0 component video data using an intra-frame compression algorithm. For example, such an algorithm as full-frame 1/10 JPEG compression is used. Ultimately, the stamp video encoder 19 generates stamp video data, such as H(120)×V(80/96), 4:2:0, bit frame rate=full, 1/10 JPEG compressed data (approximately 700 kbps). The compression algorithm, as used in for example the DV standard, may also be used. The DV standard is intended for compressing the volume of data, such as digital video data, to approximately one-fifth, and is used in a digital video equipment for household use or a fraction of the professional digital video equipment. This DVD standard realizes efficient compression of video data by the combination of discrete cosine transform (DCT) and variable length coding (VLC).

The audio process controller 23 samples the audio data from the A/D converter 22 with a sampling frequency Fs=48 kHz to generate digital audio data of high sound quality (such as 16 bits) to send the so produced data to the media controller 20 and to the FIX SRC 25.

Figure 6:
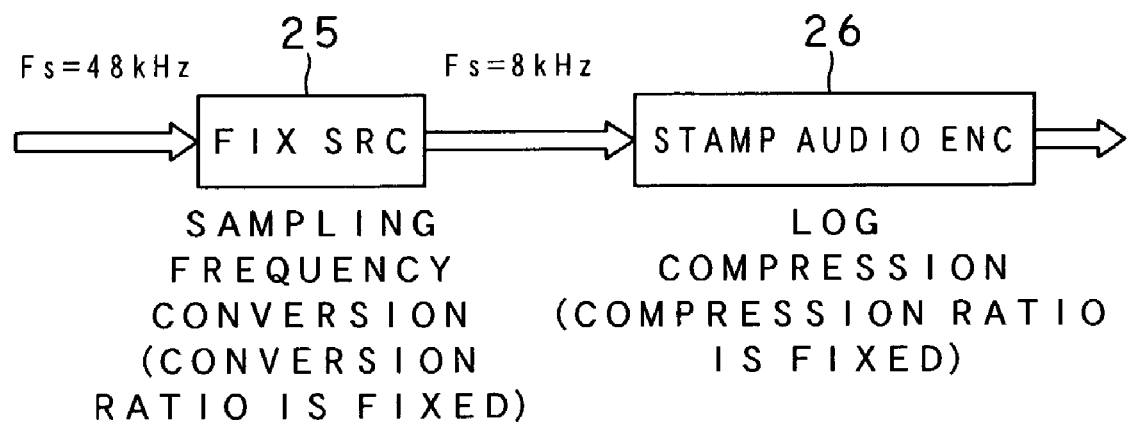
FIG. 6 illustrates generation of stamp audio data.

Referring to FIG. 6, generation of stamp audio data by the FIX SRC 25 and by the stamp audio encoder 26 is explained. The FIX SRC 25 converts the sampling rate Fs=48 kHz of the digital audio data from the audio process controller 23 to Fs=8kHz by the conversion ratio of ⅙. By this conversion ratio, it is determined up to which tuple speed the interval of the reproduced sound may be changed at the time of high speed reproduction, such as at the time of retrieval by search audio. In the present embodiment, the conversion ratio is set to ⅙ because the human being is able to recognize the speech clearly up to several tuple speeds at most during high speed reproduction such that several tuple speed is suitable as practical setting. The stamp audio encoder 26 compresses 16 bit digital audio data with Fs=8 kHz to Fs=8 kHz, 8 bits by for example log compression which is the same as that used in transmission over a telephone network. This is equivalent to 73 dB which is the dynamic range of 13 bits. The speech recognition level is 97% or higher, single tone clarity is 90% and the degree of sentence comprehension is 100%, these representing sufficient and necessary quality. The stamp audio data of Fs=8 kHz and 8 bits, thus obtained, are routed to the media controller 20.

The data recording device 5 for recording high rate data and low rate data pertinent to pictures and speech on the optical disc OD has been explained as above in advance of explanation of the data reproducing device 1.

The data reproducing device 1, as the first embodiment of the present invention, is now explained in detail. This data reproducing device 1 reproduces the data from the optical disc, which has recorded thereon the high rate data and the low rate data, concerning the same material, by the data recording device 5.

First, the data reproducing device will be explained in its entirety in the order of data flow.

Figure 7:
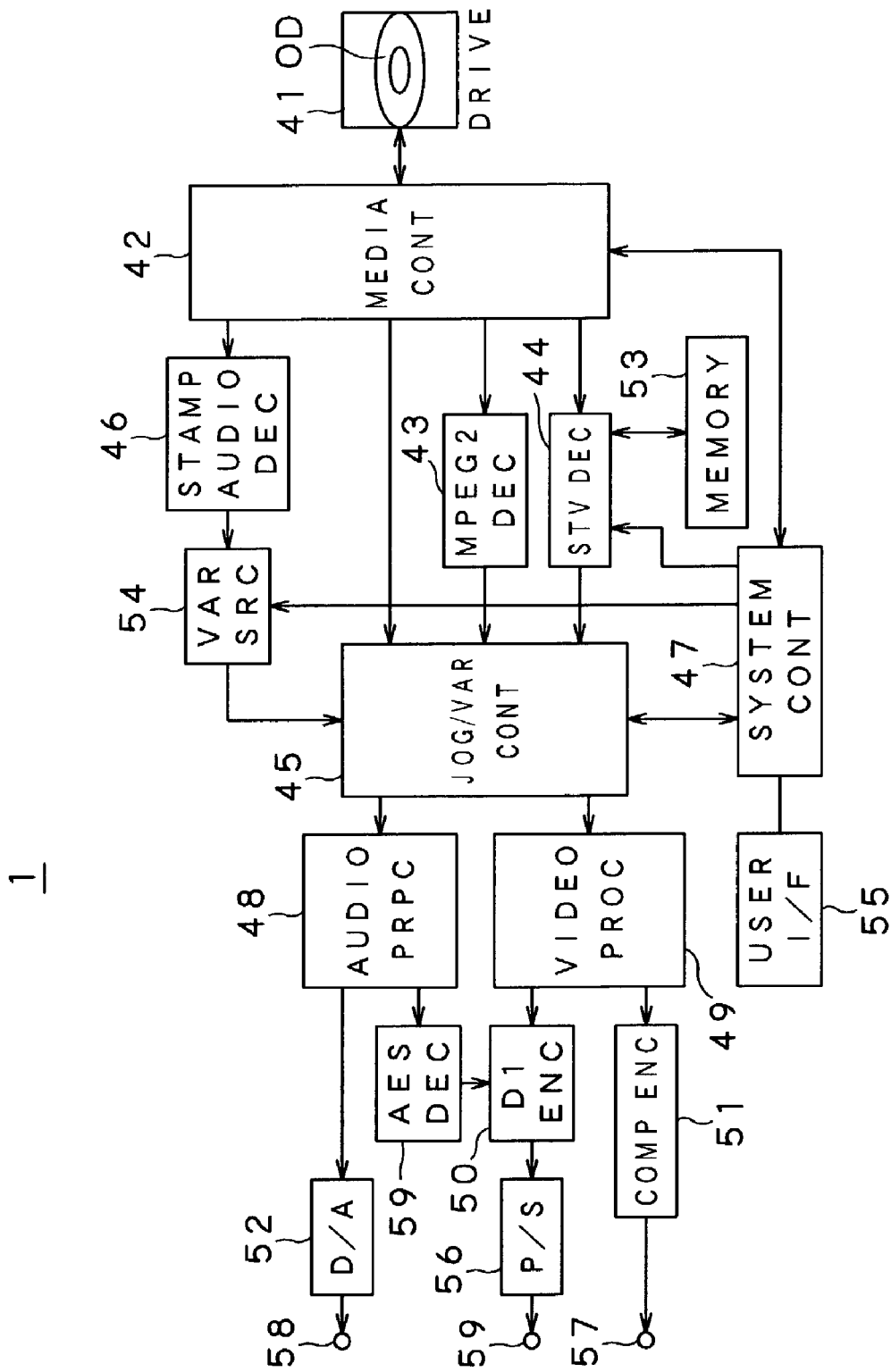
FIG. 7 is a block diagram showing a structure of a data reproducing device.

Referring to FIG. 7, a replay driver 41 refers to a management area ARM of the optical disc OD, under a command from a media controller 42, to read out MPEG2 video data, high sound quality audio data, stamp video data or stamp audio data, from the high quality recording area ARH or low quality recording area ARL, to send the so read out data to the media controller 42.

The MPEG2 video data and the high sound quality digital audio data are supplied to an MPEG decoder 43 and to a reproduction switching controller (JOG/VAR CONT) 45, via media controller 42, respectively. Alternatively, the stamp video data and the stamp audio data are sent to a stamp video decoder (STV DEC) 44 and to a stamp audio decoder (Stamp Audio DEC) 46, via media controller 42, respectively.

The MPEG2 video data is decompressed by the MPEG2 decoder 43 and thence supplied to a reproduction switching controller 45. The stamp video data are decoded by the stamp video decoder 44 and thence supplied to the reproduction switching controller 45. The stamp audio data is decoded by the stamp audio decoder 46 and has its sampling rate changed by a variable sampling rate converter (VAR SRC) 54 so as to be supplied to the reproduction switching controller 45.

When the user selects the high speed reproduction and the reproduction switching controller 45 is switched to the high speed reproduction mode, the stamp video data, decoded by the stamp video decoder 44, is sent to a video process controller (VIDEO PROC) 49, while the stamp audio data, having its sampling rate converted by the VAR SRC 54, is sent to an audio process controller (AUDIO PROC) 48.

When the user selects the normal reproduction and the reproduction switching controller 45 is switched to the normal speed reproduction mode, the MPEG2 video data, decoded by the MPEG2 decoder 43, is sent to the video process controller 49, while the high sound quality audio data, directly supplied from the media controller 42, is supplied to the audio process controller 48.

The video data, video-processed by the video process controller 49, is supplied to a D1 encoder 50 or to a composite encoder 51, so as to be processed into output video data conforming to respective formats. The audio data, audio-processed by the audio process controller 48, is converted into analog audio signals by a D/A converter circuit 52.

The operation of the respective portions is now explained.

When the user has selected the high speed reproduction, the media controller 42 controls the reproducing driver 41, based on the control signal from a system controller 47, to cause stamp video data and stamp audio data to be read out from the optical disc OD. The system controller 47 causes the stamp video data and the stamp audio data to be processed with error correction using the error correction code to supply the stamp video data and the stamp audio data to the stamp video decoder 44 and to the stamp audio decoder 46, respectively. When the user has selected the normal reproduction, the system controller 47 controls the reproducing driver 41 based on the control signal from the system controller 47 to cause the MPEG2 video data and the high sound quality audio data to be read out from the optical disc OD. The system controller 47 causes the MPEG2 video data and the high sound quality audio data to be processed with error correction using the error correction code to send the MPEG2 video data and the high sound quality audio data to the MPEG2 decoder 43 and directly to the reproduction switching controller 45, respectively.

The MPEG2 decoder 43 decompresses the MPEG2 video data, encoded with the MPEG2 format, to route the 4:2:2 high resolution video decoded output to the reproduction switching controller 45.

The stamp video decoder 44 decodes the stamp video data and routes the video decoded output lower in resolution than the high resolution video decoded output to the reproduction switching controller 45. To this stamp video decoder 44 is connected a memory 53, such as RAM, for transiently storing the stamp video data, as a specified example of the low rate video data.

The stamp audio decoder 46 executes log decompression on the stamp audio data to send the decompressed data to the VAR SRC 54, which then converts Fs=8 kHz of the stamp audio data to Fs conforming to the high speed reproduction desired by the user, such as Fs of 48 kHz, to send the so converted data to the reproduction switching controller 45.

When the user selects the high speed reproduction and the system controller 47 sets the reproduction to high speed reproduction mode, the reproduction switching controller 45 sends the stamp video output for high speed reproduction, as decoded by the stamp video decoder 44, using the memory 53, to the video process controller 49. Similarly, when the reproduction is set to a high speed reproduction mode, the reproduction switching controller 45 routes the stamp audio data, the sampling frequency of which has been converted by the VAR SRC54, to the audio process controller 48.

When the user selects the normal reproduction and the system controller 47 sets the reproduction to the normal reproduction mode, the reproduction switching controller 45 routs the MPEG2 video data output, decoded by the MPEG2 decoder 43, to the video process controller 49. Similarly, when the reproduction is set to the normal reproduction mode, the reproduction switching controller sends the high sound quality audio data, directly supplied from the media controller 42, to the audio process controller 48.

The video process controller 49 performs video processing, such as noise reduction or picture quality correction, on the MPEG2 video data or stamp video data, supplied from the reproduction switching controller 45, to send the resulting data to the D1 encoder (ENC) 50 or to the composite encoder (Comp ENC) 51.

The D1 encoder 50 encodes the output video data from the video process controller 49 in accordance with the D1 format to send the encoded data to a parallel/serial converting circuit (P/S) 56. The parallel/serial converting circuit 56 outputs serial digital output video data conforming to the SDI format.

The composite encoder 51 encodes the output video data from the video process controller 49 into composite data to output the composite output video data R, G and B at an output terminal 57.

The audio process controller 48 performs audio processing, such as processing for contiguity along the time axis, level adjustment or noise reduction, on the high sound quality audio data or the stamp audio data from the reproduction switching controller 45, before supplying the data to the D/A converting circuit 52. The D/A converting circuit 52 converts the audio data into analog audio signals to output the so converted signals at an output terminal 58.

The audio process controller 48 sends the high sound quality audio data or stamp audio data from the reproduction switching controller 45 to an AES decoder 59. The AES decoder 59 decodes the AES from the audio output data from the reproduction switching controller 45 to send the decoded data to the D1 encoder 50.

The system controller 47 is responsive to the user command from a user interface (User I/F) 55 to control the media controller 42. The system controller 47 also sends the high speed control signal to the VAR SRC54, while supplying the switching control signal to the reproduction switching controller 45.

The essential portions of the data reproducing apparatus, that is the MPEG2 decoder 43, stamp video decoder 44, stamp audio decoder 46, VAR SRC54 and the reproduction switching controller 45, are now explained in detail.

The MPEG2 decoder 43 includes a variable length decoder (VLD), an inverse quantizer (IQ), an adder, an inverse discrete DCT (IDCT) unit, a frame memory (FM), a motion compensation (MC) unit and a discrete cosine transform (DCT) unit. The MPEG2 decoder 43 decodes the MPEG2 video data supplied at the maximum rate of 15 Mbps from the media controller 42. Specifically, MPEG2MP@ML (Main Profile/Main Level) decoder is used as MPEG2 decoder 43. Of course, the MPEG2MP@HL (Main Profile/High level) may also be used. Meanwhile, this data reproducing unit 1 uses the MPEF2 decoder 43 because the data recording device 5 uses the MPEG2 encoder. If the data recording device 5 uses other types of the high resolution video encoder, a decoder having a counterpart structure is to be used.

Figure 8:
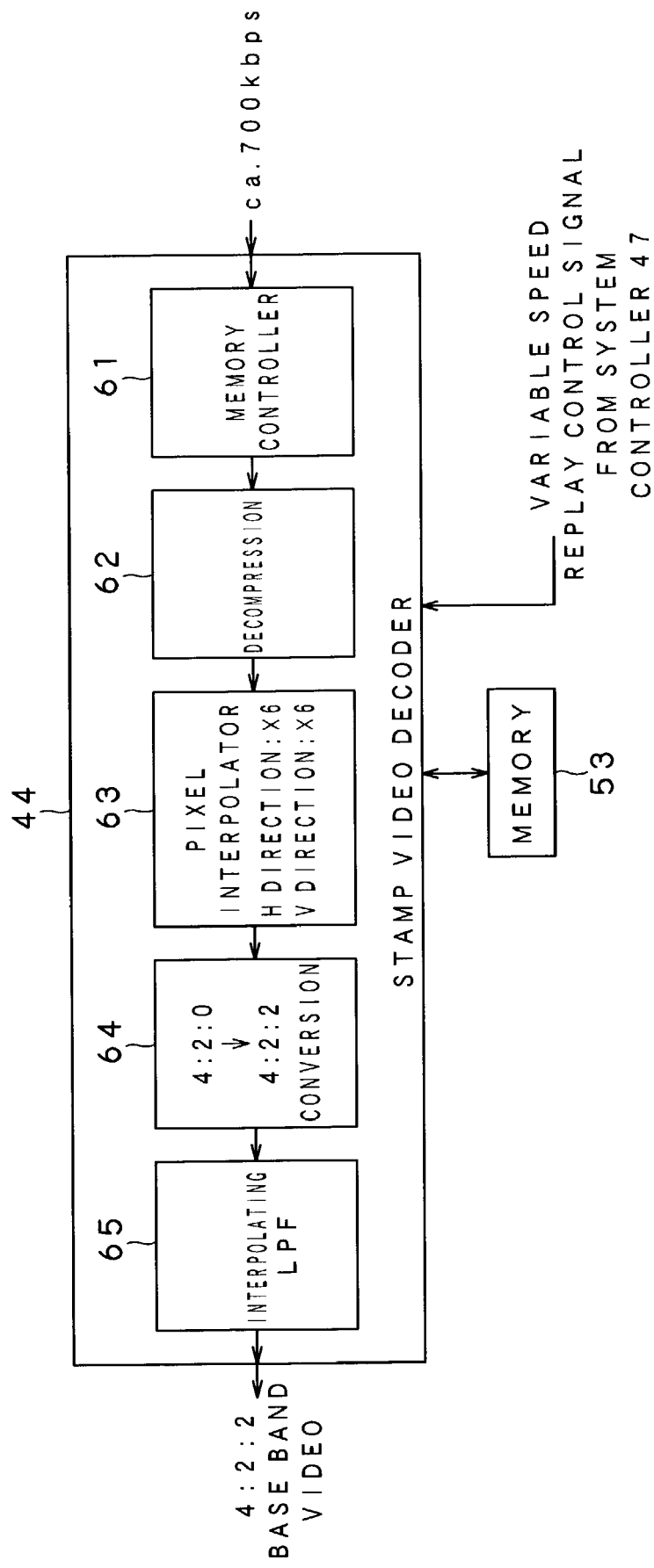
FIG. 8 is a block diagram showing a detailed structure of a stamp video decoder as an essential portion of the data reproducing device.

The stamp video decoder 44 decodes the 4:2:0 stamp video data, supplied from the video controller 42 at approximately 700 Kbps, into the 4:2:2 baseband component video data Y, Cb and Cr, by a structure shown in FIG. 8. The stamp video decoder is made up by a memory controller 61, a decompression unit 62, a pixel interpolator 63, a 4:2:0 to the 4:2:2 converter 64, and an interpolating LPF 65. The stamp video data is sent via memory controller 61 to the decompression unit 62. The decompression unit 62 decompresses the stamp video data from the memory controller 61. The pixel interpolator 6-tuples the data, decimated to one-sixth in each of the H and V directions by the pixel decimating unit 32 of the stamp video encoder 19, in each of the H and V directions. The 4:2:0 to the 4:2:2 converter 64 converts the sampling frequency ratio of Y, Cb and Cr of 4:2:0 to 4:2:2. The interpolating LPF 65 interpolates the 4:2:0 Y, Cb and Cr. Thus, the stamp video decoder 44 is able to generate 4:2:2 baseband video data to output the so generated data to the reproduction switching controller 45. This stamp video decoder 44 is supplied with a high speed reproduction control signal from the system controller 47. This high speed reproduction control signal is a control signal used when the stamp video data is to be reproduced at a high speed responsive to the user's request. Based on this high speed reproduction control signal, the stamp video decoder 44 updates the display on a picture frame of the display device 2, portion-wise, using the memory 53, to display several frames of the picture information simultaneously on discrete portions of the picture frame. That is, the stamp video decoder forms each frame of output video data so that at least portions of each of a preset number not less than 1 of frames of stamp video data are displayed in one and the same frame and so that these portions are updated with stamp video data read out from the optical disc OD for each frame of the output video data.

As specified examples, the preset number of frames of the read-out stamp video data is stored in the memory 53 and different portions of the low rate video data of the preset number of frames of the output video data are read out and combined from one frame of the output video data to the next to update the portions from one frame of the output video data to the next. The operation of the high speed reproduction will be explained in detail subsequently.

The operation of the data reproducing apparatus 1 outputting the high sound range noise or the sound shifted to the high sound range from the loudspeaker as several frames of the picture information are displayed simultaneously on discrete portions of the picture frame is now explained. This is the high speed reproducing operation of the stamp audio data by the stamp audio decoder 46 and the VAR SRC54.

Figure 9:
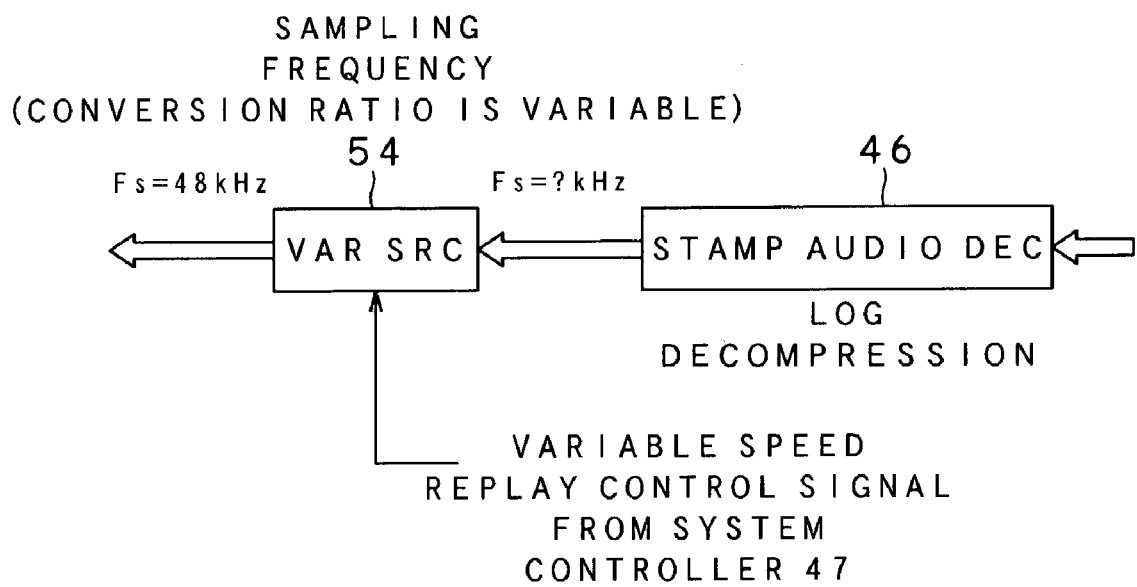
FIG. 9 illustrates high-speed stamp audio reproduction.

In FIG. 9, the stamp audio decoder 46 performs log decompression of the stamp audio data of Fs=8 kHz and 8 bits to Fs=8 kHz and 16 bits to send the decompressed data to the VAR SRC54. The VAR SRC54 converts stamp audio data of Fs=8 kHz and 8 bit into Fs desired by the user to send the resulting data to the reproduction switching controller 45. This stamp audio decoder 46 is also supplied from the system controller 47 with the high speed reproduction control signal from the system controller 47. This high speed reproduction control signal is also the control signal that is used in high speed reproduction of stamp audio data responsive to the user's request. When a high speed reproduction control signal commanding e.g., 6-tupled speed reproduction of the stamp audio data of Fs=8 kHz and 16 bits is supplied, the VAR SRC54 converts the sampling frequency Fs to 48 kHz. When the resulting data is converted to analog audio signals, the result is the speech with a one-sixth pitch. The high speed audio reproduction will be explained in detail subsequently.

The reproduction switching controller 45 selects a stamp video output from the stamp video decoder 44, high-speed reproduced based on the high-speed reproduction control signal, or a video data output supplied from the MPEG2 decoder 43, responsive to the switching control signal supplied from the system controller 47, to send the selected output to the video process controller 49. On the other hand, the reproduction switching controller 45 selects the stamp audio output, supplied from the VAR SRC54, high speed reproduced based on the high speed reproduction control signal, or the high sound quality digital audio data directly supplied from the media controller 42, depending on the switching control signal supplied from the system controller 47, to send the selected signal to the audio process controller 48.

The operation of the data reproducing apparatus 1 updating the picture display on the display device 2 portion-wise for discretely simultaneously demonstrating several frames of the picture information on a picture of each output frame, is now explained in detail.

With this data reproducing apparatus 1, high speed picture reproduction is carried out using stamp video data. As compared to the MPEG2 video data with the maximum of approximately 15 Mbps, the stamp video data is of the low rate of approximately 700 kbps, and is recorded in a region distinct from the region on the optical disc OD where the MPEG2 video data is recorded. Meanwhile, recording the high rate MPEG2 video data in a region on the optical disc OD distinct from the region where the low rate stamp video data is recorded is merely illustrative and is not intended for limiting the invention.

Thus, in the high speed reproduction mode, the low rate picture can be read out from the optical disc OD more readily than the high rate picture, such that, by data re-arraying, it is possible to display simultaneously at least portions of each of several frames of the picture information on a picture frame corresponding to each frame of the output video data.

Of course, high speed reproduction of the MPEG2 video data is possible. However, with the MPEG2 video data, the I-, P- and B-pictures are allocated as a long GOP in which the number of pictures N=15 and a period M of appearance of I or P is such that M=3. Of these, only the I-pictures are decodable per se. For decoding the P-picture, the information of the temporally previous I- or P-pictures is required, whereas, for decoding the B-picture, the information of the temporally previous and temporally posterior P-pictures, of which one may be an I-picture, is required. Thus, with the MPEG2 video data, in which data compression is by exploiting temporal correlation, only the I-pictures can be positively decoded when frames are reproduced in a skipping fashion as in the case of high-speed reproduction. Although the P-picture/B- picture is decodable from time to time depending on the reproducing speed or on the reproducing pattern, such decoding is not necessarily guaranteed.

Figure 10:
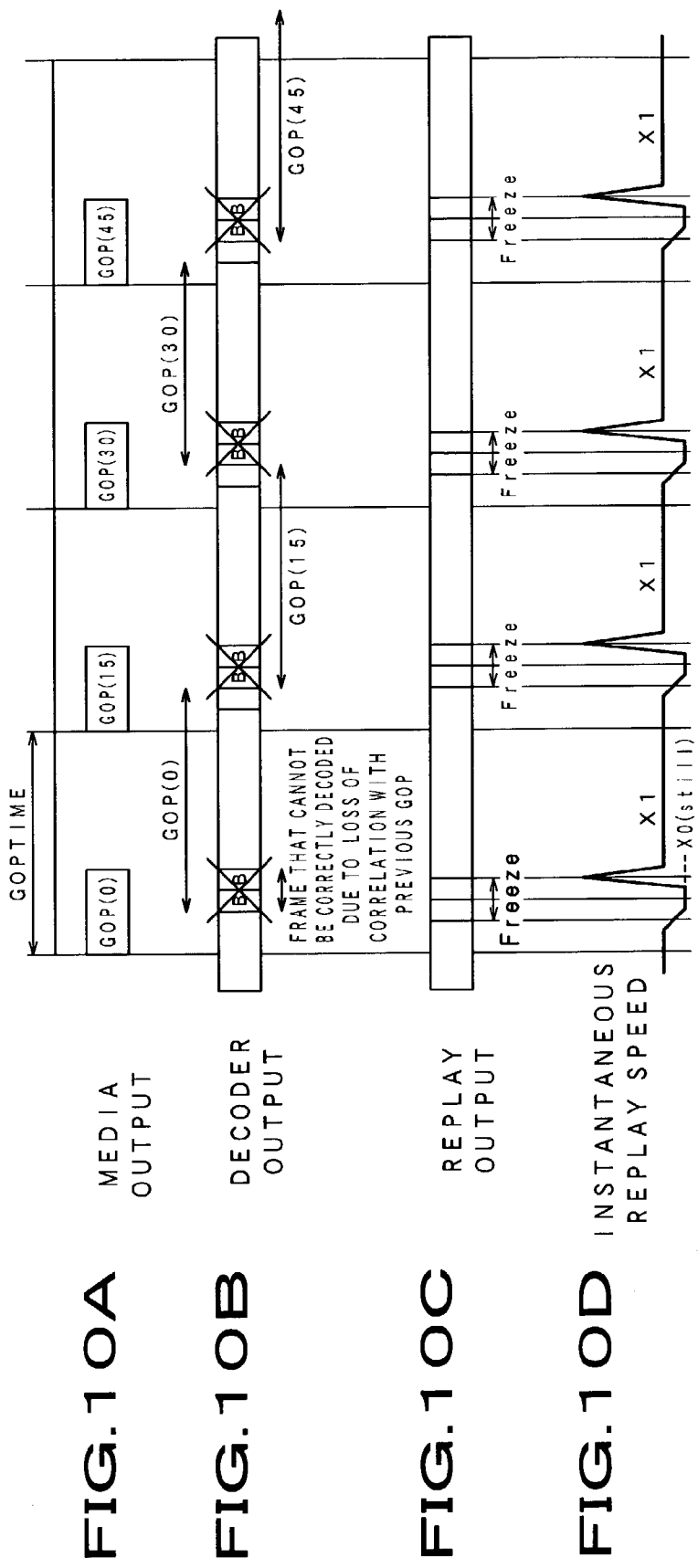
FIGS. 10A to 10D are a timing charts for the case of, for example, 15-tuple speed reproduction employing MPEG2 video data (MPEG2 MP@ML, N=15 and M=3).

FIG. 10 shows a timing chart in case high speed reproduction at for example the 15-tuple speed of the MPEG2 video data (MPEG2MP@ML, number of frames N=15 and the period of appearance M=3). This case is not targeted by the present invention and is shown only by way of comparison with the present invention, that is, for illustrating that, due to limitations on the number of decodable frames at the time of high-speed reproduction, as imposed by the decoder processing speed, the interval of frame skipping instantaneously ceases to be constant such that jerkiness may be produced for the same number of skipped pictures.

Since the reproduction is the 15-tupled reproduction, the media output of FIG. 10A is the GOP (0) followed by GOP (15), GOP (30) and GOP (45), with omission of the respective intermediate 14 frames. The MPEG2 decoder output of FIG. 10B cannot be decoded correctly because e.g., two B-frames of GOP (0), GOP (15), GOP (30) and GOP (45) become uncorrelated with the previous GOPs. Thus, in e.g., the GOP (0), the instantaneous reproducing speed of two B-frames in the reproduced output of FIG. 10C demonstrated on the display device are in the still state, such as 0-tupled speed (×0), as shown in FIG. 10D, thus producing a freeze. The instantaneous reproducing speed is then increased precipitously (213-tupled speed) then becoming one-tupled speed within the GOP (0). The same state subsequently occurs in the GOP (15), GOP(30) and GOP(45), that is, the two B-frames in these GOPs are in the still state, with the instantaneous reproducing speed then increasing precipitously to subsequently become the one-tupled speed within the respective GOPs.

Figure 11:
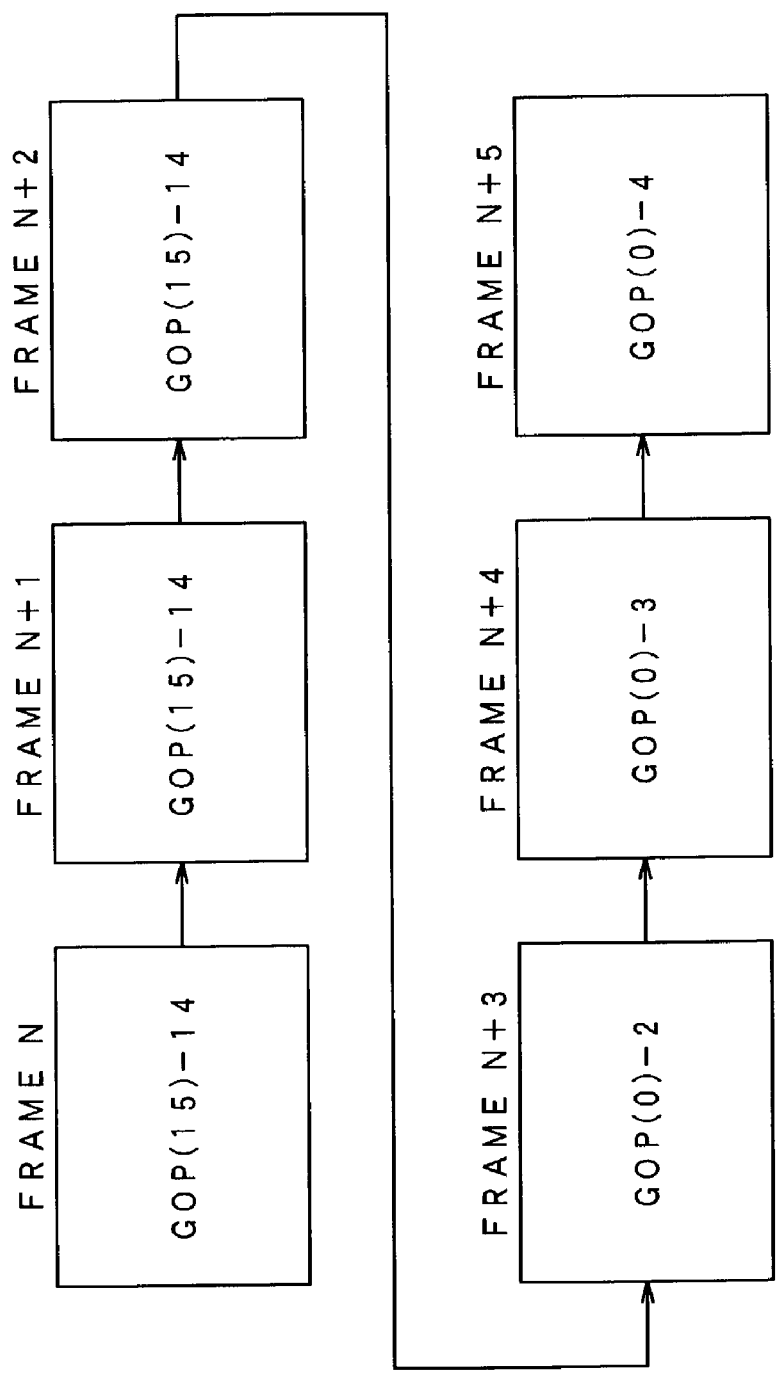
FIG. 11 schematically shows the 15-tupled speed reproduction of MPEG2 video data in accordance with the timing chart of FIG. 10.

FIG. 11 shows the flow of reproducing time in the 15-tupled speed reproduction of the MPEG2 video data in accordance with the above-described flowchart. This figure shows frame representation on the display device of frame N, frame N+1, frame N+2, . . . , frame N+5 with lapse of the replay time, in terms of the GOP numbers and the changes in the picture numbers within the GOPs. The reproduction is jerky, with the movement being in cessation from the frame N to the frame N+2, the reproducing speed instantaneously changing from frame N+2 to frame N+3 and movement commencing precipitously from frame N+3 to frame N+5.

With this data reproducing device 1, the high speed reproduction of the same video material is carried out using stamp video data, as now explained, instead of employing the replay MPEG2 video data, which gives only jerky high-speed reproduction, as described above.

Figure 12:
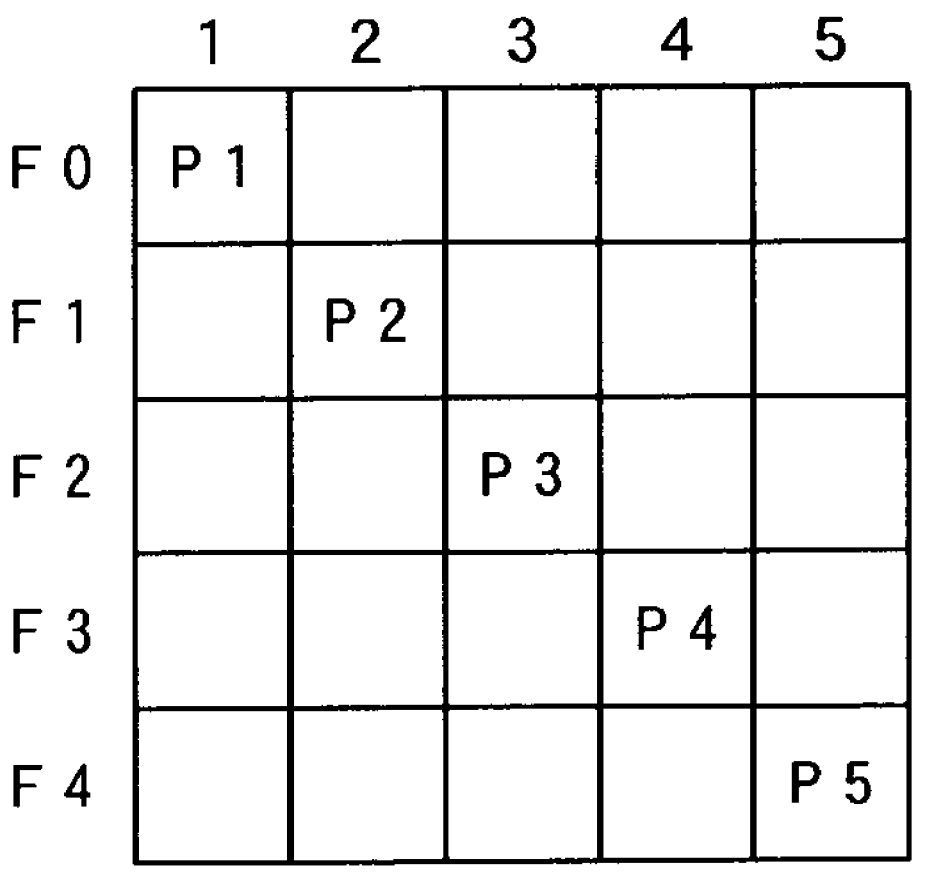
Figure 13:
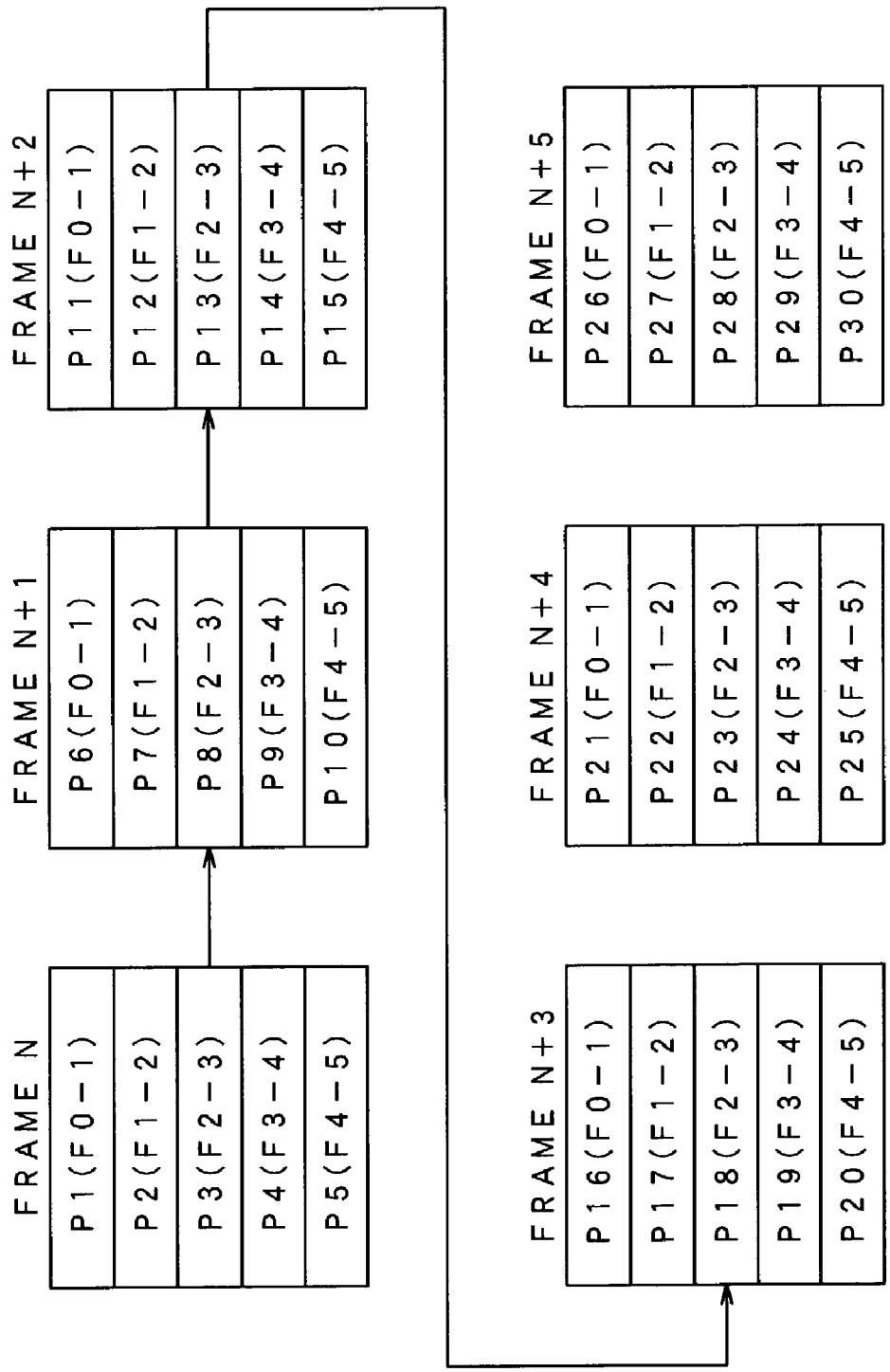
FIG. 13 shows display transition on a picture frame with lapse of time.

Referring first to FIGS. 12 and 13, the operation of the data reproducing device 1 performing 5-tupled reproduction is explained. FIG. 12 shows a necessary minimum memory space for the data reproducing device 1 in carrying out the 5-tupled reproduction. The low-rate stamp video data, generated by the stamp video encoder 19 and recorded on the optical disc OD, are indicated on the frame basis as P1, P2, P3, P4, P5, . . . . It is noted that stamp video data P1 to P30 are written five-by-five in associated areas in the memory 53. FIG. 13 shows display transition on the picture frame in association with the lapse of time.

When the user selects the 5-tupled reproduction via user interface 55, the system controller 47 controls the media controller 42 to read out five stamp video data P1, P2, P3, P4 and P5 from the optical disc OD by the reproducing driver 41, while writing the data in five associated memory areas F0, F1, F2, F3 and F4 of the memory 53 on the frame basis.

The data reproducing device 1 reads out portion-wise the video data P1, P2, P3, P4 and P5, written on the frame basis in the five memory areas F0, F1, F2, F3 and F4 of the memory 53, and decodes the so read out data, as shown in FIG. 12, to display the five-frame picture information in a split fashion on the picture frame as indicated for the frame N in FIG. 13. Although here the stamp video data written in the memory 53 is read out and subsequently decoded, it is also possible to decode the data and subsequently store the decoded data in the memory 53. In FIG. 13, P1 (F0-1) means a portion of P1 written on the frame basis in F0 of memory 53, that is a region that can be identified by a column of number 1 and a row of F0 imaginarily shown on the memory space. Similarly, P2 (F1-2) means a portion of P2, that is a region that can be identified by a column of number 2 and a row of F1 imaginarily shown on the memory space. Likewise, P3(F2-3), P4 (F3-4) and P5 (F4-5) mean portions of P3, P4 and P5 written on the frame basis in F2, F3 and F4 of the memory 53, respectively.

Meanwhile, the frame N shown in FIG. 13 shows a frame, as demonstrated on the display device, in the temporal meaning of the term. The same applies for the frames N+1, N+2, . . . . In the above description, the frame basis refers to being based on one frame on which the stamp video data is based.

The frames N, N+1, N+2, . . . in FIG. 13 are each represented by for example 1/30 second. Of these, the frame N+1, next following the frame N, is an instance of display in which portions P6 (F0-1), P7 (F1-2), P8 (F2-3), P9 (F3-4) and P10 (F4-5) of P6 to P10, written on the frame basis in the memory spaces F0 to F4 of FIG. 12, next to the frames P1 to P5, are decoded and reproduced. The frame N+2 is an instance of display in which portions P11 (F0-1), P12 (F1-2), P13 (F2-3), P14 (F3-4) and P14 (F4-5) of P11 to P15, written on the frame basis next to the frames P6 to P10 in F0 to F4 of the memory space of FIG. 12, are decoded, reproduced and demonstrated on the picture frame. The frame N+3 is an instance of display in which respective portions P16 (F0-1), P17 (F1-2), P18 (F2-3), P19 (F3-4) and P20 (F4-5) of P16 to P20 are decoded, reproduced and demonstrated on the picture frame. The frame N+4 is an instance of display in which respective portions P21 (F0-1), P22 (F1-2), P23 (F2-3), P24 (F3-4) and P25 (F4-5) of P21 to P25 are decoded, reproduced and demonstrated on the picture frame. The frame N+5 is an instance of display in which respective portions P26 (F0-1), P27 (F1-2), P28 (F2-3), P29 (F3-4) and P30 (F4-5) of P26 to P30 are decoded, reproduced and demonstrated on the picture screen.

In this manner, the data reproducing device 1 is able to update the picture display on the display device 2 portion-wise from the frame N to the frame N+5 to display the picture information of five frames discretely on the picture frame. In the present specification, the expression of several frames mean the picture information (stamp video data) of respective five frames of P1 to P5, P6 to P10, P11 to P15, P16 to P20, P21 to P25 and P26 to P30 in the above-described case.

Figure 15:
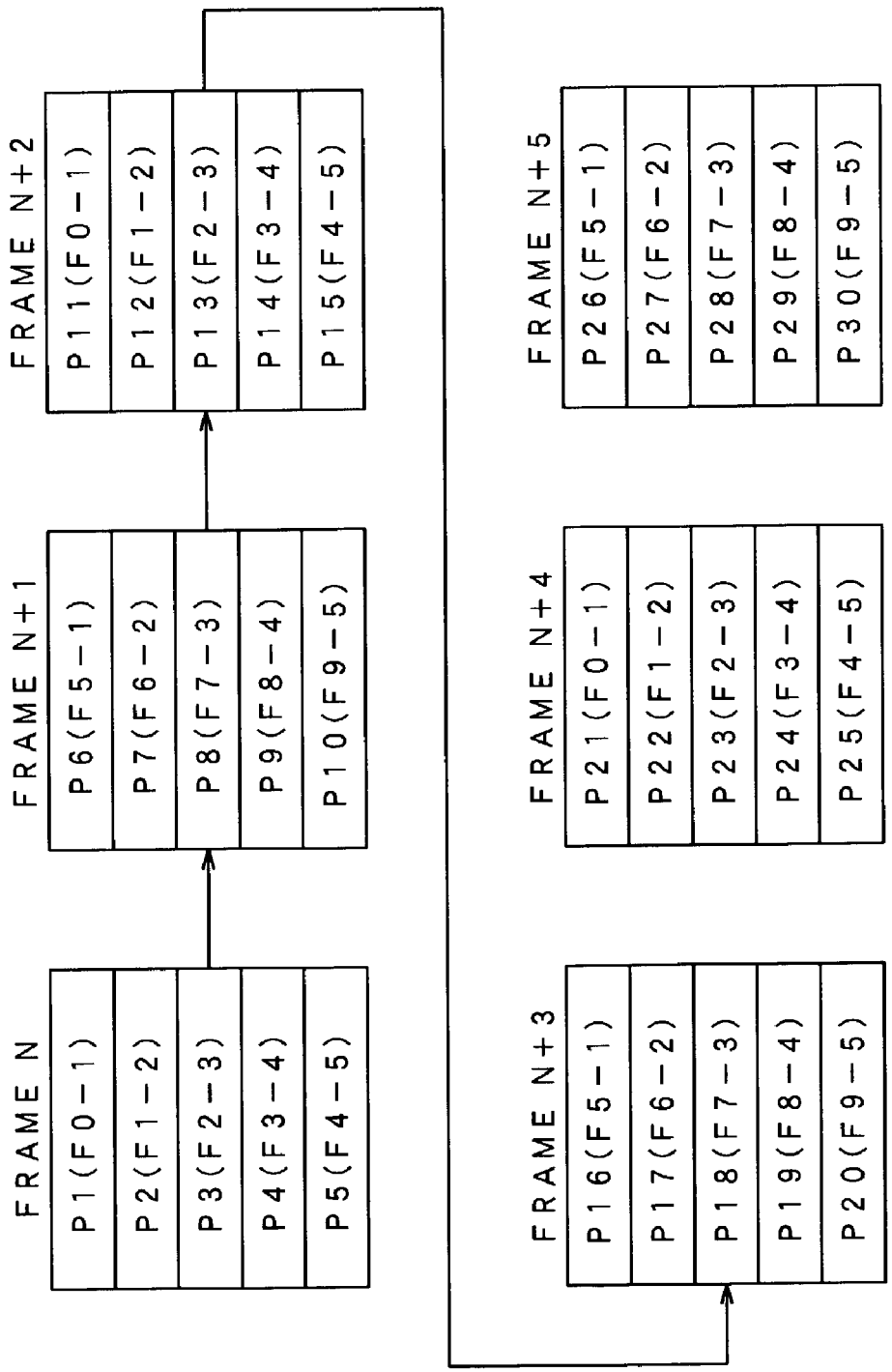
FIG. 15 shows display transition on a picture frame with lapse of time.

A first modification of the five-tupled speed reproduction carried out by the data reproducing device 1 when the memory 53 of the data reproducing device 1 has a memory space different from that shown in FIG. 12. Although FIG. 14 shows only F0 to F7, it is assumed that there are frames F0 to F9 insofar as the ensuing description is concerned. In respective portions of F0 to F9, the stamp video data P1 to P30 are written as the data are updated on the frame basis. FIG. 15 shows transition of demonstration on the picture frame with lapse of time.

When the user selects the 5-tupled reproduction via user interface 55, the system controller 47 controls the media controller 42 to cause the reproducing driver 41 to read out the five stamp video data P1, P2, P3, P4 and P5 from the optical disc OD to write the read-out data in associated five memory spaces F0, F1, F2, F3 and F4 of the memory 53 on the frame basis.

The data reproducing device 1 decodes and reproduces respective portions P1 (F0-1), P2 (F1-2), P3 (F2-3), P4 (F3-4) and P5 (F4-5) of the stamp video data P1, P2, P3, P4 and P5, written on the frame basis in the five memory spaces F0, F1, F2, F3 and F4 of the memory 53, as shown in FIG. 15, to display the so reproduced data as the frame N.

At this time, the stamp video data P6 to P10 have already been written in the memory spaces F5 to F9 of FIG. 14 on the frame basis. In the frame N+1, next to the frame N, the data reproducing device 1 decodes and reproduces respective portions P6 (F5-1), P7 (F6-2), P8 (F7-3), P9 (F8-4) and P10 (F9-5) of P6 to P10, written on the frame basis next to P1 to P5, from F5 to F9 of FIG. 14, to demonstrate the reproduced data.

At this time, the stamp video data P11 to P15 have already been written in the memory spaces F0 to F4 of FIG. 14 on the frame basis. In the frame N+2, the data reproducing device 1 decodes and reproduces, from the memory spaces F0 to F4, respective portions P11 (F0-1), P12 (F1-2), P13 (F2-3), P14 (F3-4) and P15 (F4-5), of P11 to P15, written on the frame basis, to demonstrate the reproduced data.

In similar manner, the data reproducing device 1 decodes and reproduces P16 (F5-1), P17 (F6-2), P18 (F7-3), P19 (F8-4) and P15 (F9-5), from the memory spaces F5 to F9 in frame N+3, to demonstrate the reproduced data. In frame N+4, the data reproducing device 1 decodes and reproduces P21 (F0-1), P22 (F1-2), P23 (F2-3), P24 (F3-4) and P25 (F4-5), from the memory spaces F0 to F4, to demonstrate the reproduced data. Also, in frame N+5, the data reproducing device 1 decodes and reproduces P26 (F5-1), P27 (F6-2), P28 (F7-3), P29 (F8-4) and P30 (F9-5), from the memory spaces F5 to F9, to demonstrate the reproduced data.

In this manner, the data reproducing device 1 of the present first modification of the 5-tupled reproduction similarly is able to update the picture display on the display device 2 portion-wise to discretely display the picture information of five frames on the picture frame.

Although there are provided memory spaces F0 to F9 of the memory 53, in the above-described case, the memory may also be divided into 15 of from F0 to F14. Moreover, in the five-tupled speed reproduction, it is unnecessary for the number of the memory spaces to be multiples of five, it being only sufficient that there are five or more memory spaces.

Figure 17:
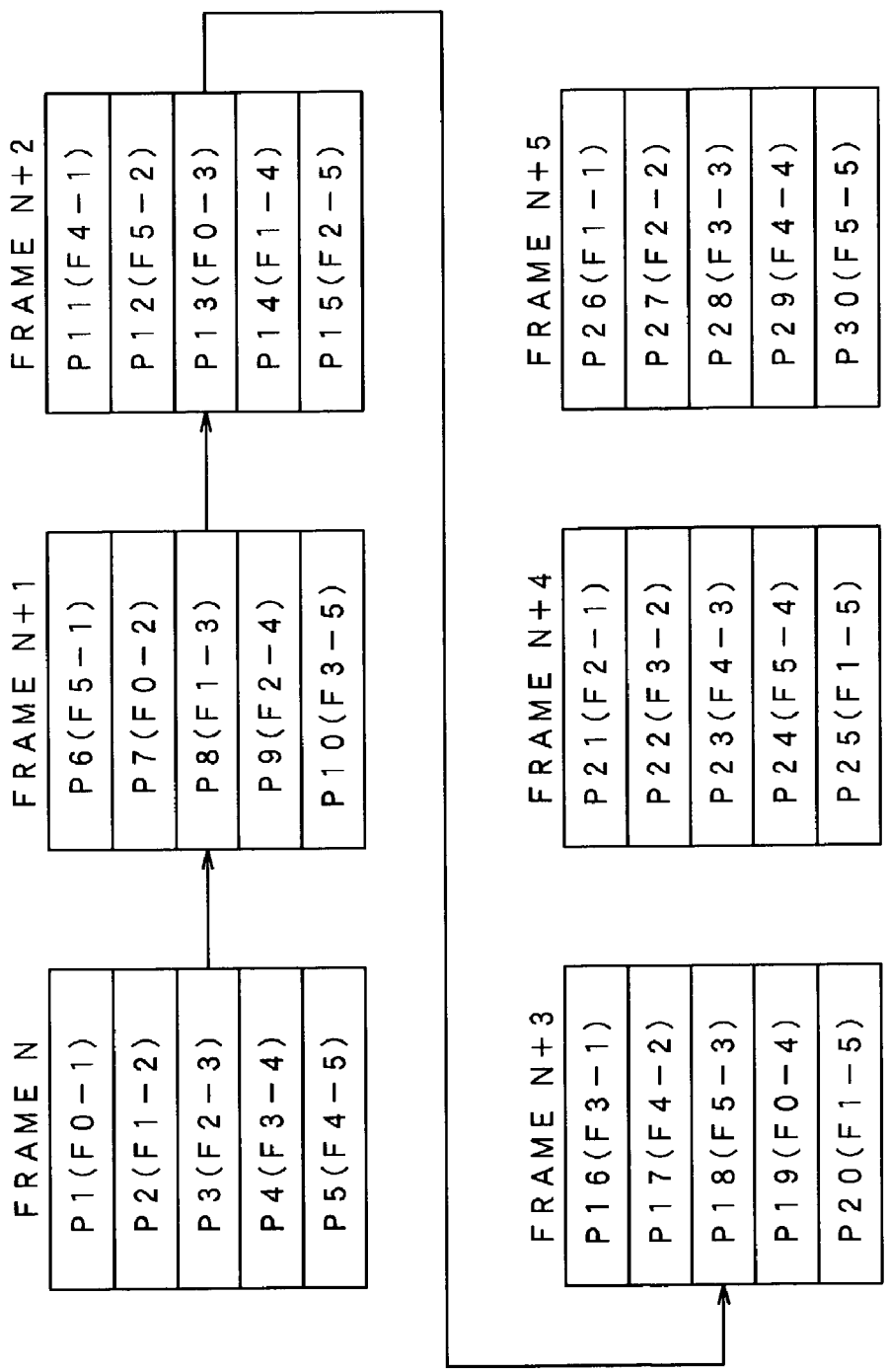
FIG. 17 shows display transition on a picture frame with lapse of time.

A second modification of the 5-tupled reproduction, performed by the data reproducing device 1 in case there are six memory spaces of F0 to F5, as shown in FIG. 16, is explained. Although the stamp video data P1 to P30 are written five-by-five in the memory 53, the write positions are shifted, because there are six memory spaces. For example, although P1 to P5 are written in F0 to F4, respectively, the next P6, P7, P8, P9 and P10 are written in F5, F0, F1, F2 and F3, respectively. The next P11, P12, P13, P14 and P15 are written in F4, F5, F0, F1 and F2, respectively, while the further next P16, P17, P18, P19 and P20 are written in F3, F4, F5, F0 and F1. FIG. 17 shows display transition on the picture frame with lapse of time.

When the user selects the five-tupled reproduction via user interface 55, the system controller 47 controls the media controller 42 to read out five stamp video data P1, P2, P3, P4 and P5 from the optical disc OD by the reproducing driver 41, while writing the data in the five memory spaces F0, F1, F2, F3 and F4 of the memory 53.

The data reproducing device 1 decodes and reproduces respective portions P1 (F0-1), P2 (F1-2), P3 (F2-3), P4 (F3-4) and P5 (F4-5) (FIG. 17) of stamp video data P1, P2, P3, P4 and P5, written in the five memory spaces F0 F1, F2, F3 and F4 of the memory 53 on the frame basis, to display the reproduced data as frame N.

When next P6, P7, P8, P9 and P10 are written in the memory spaces F5, F0, F1, F2 and F3 of the memory space of FIG. 16, the data reproducing device 1 decodes and reproduces P6 (F5-1), P7 (F0-2), P8 (F1-3), P9 (F2-4) and P10 (F3-5) to display the reproduced data as frame N+1.

When next P11, P12, P13, P14 and P15 are written in the memory spaces F4, F5, F0, F1 and F2 of the memory space of FIG. 16, the data reproducing device 1 decodes and reproduces P11 (F4-1), P12 (F5-2), P13 (F0-3), P14 (F1-4) and P15 (F2-5) to display the reproduced data as frame N+2.

When next P16, P17, P18, P19 and P20 are written in the memory spaces F3, F4, F5, F0 and F1 of the memory space, the data reproducing device 1 decodes and reproduces P16 (F3-1), P17 (F4-2), P18 (F5-3), P19 (F0-4) and P20 (F1-5) to display the reproduced data as frame N+3.

When next P21, P22, P23, P24 and P25 are written in the memory spaces F2, F3, F4, F5 and F0 of the memory space, the data reproducing device 1 decodes and reproduces P21 (F2-1), P22 (F3-2), P23 (F4-3), P24 (F5-4) and P25 (F0-5) to display the reproduced data as frame N+4.

When P26, P27, P28, P29 and P30 are written in the memory spaces F1, F2, F3, F4 and F5 of the memory space, the data reproducing device 1 decodes and reproduces P26 (F1-1), P27 (F2-2), P28 (F3-3), P29 (F4-4) and P30 (F5-5) to display the reproduced data as frame N+5.

In this manner, the data reproducing device 1 of the present second modification of the 5-tupled speed reproduction is able to update the picture display on the display device 2 portion-wise to discretely display the picture information of five frames on one picture frame.

In the above-described embodiments of the 5-tupled speed reproduction, the stamp video data of up to 30 frames are read out five-by-five from the optical disc OD to the memory 53. However, actual frames are, of course, more numerous than 30 frames, such that the number of frames read out at a time may be increased by any suitable number not less than five in keeping with the number of memory spaces.

Although five-tupled speed reproduction has been explained in the foregoing, it is also possible to realize 6-tupled or 7-tupled speed reproduction by increasing the number of the memory spaces to not less than 6 or 7. On the other hand, double-, triple- or quadruple speed reproduction is also possible by providing 2, 3 or 4 memory spaces, respectively.

Figure 18:
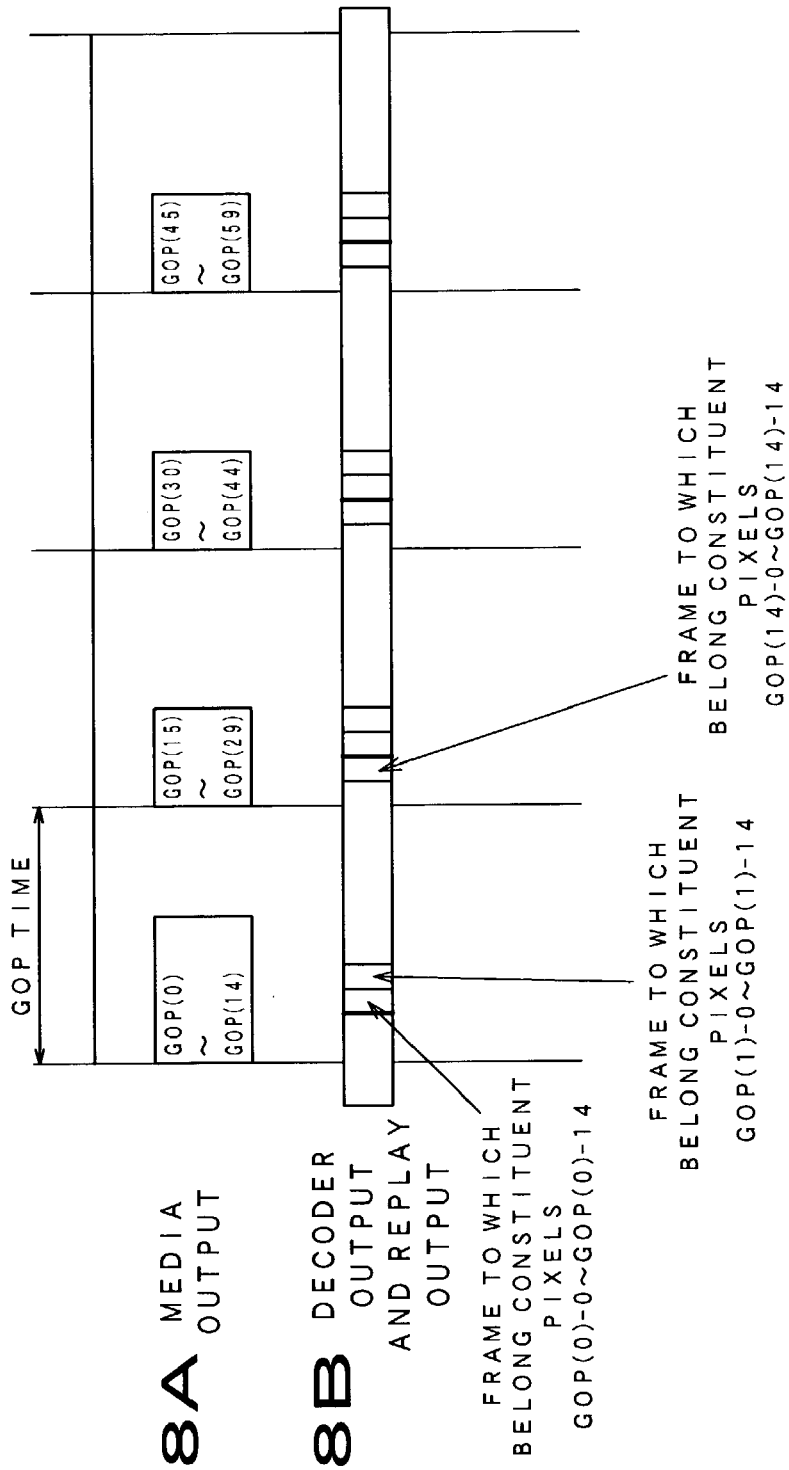
FIGS. 18A and 18B are timing charts for illustrating 15-tupled high-speed reproduction executed on a stamp video decoder of the data reproducing device.
Figure 19:
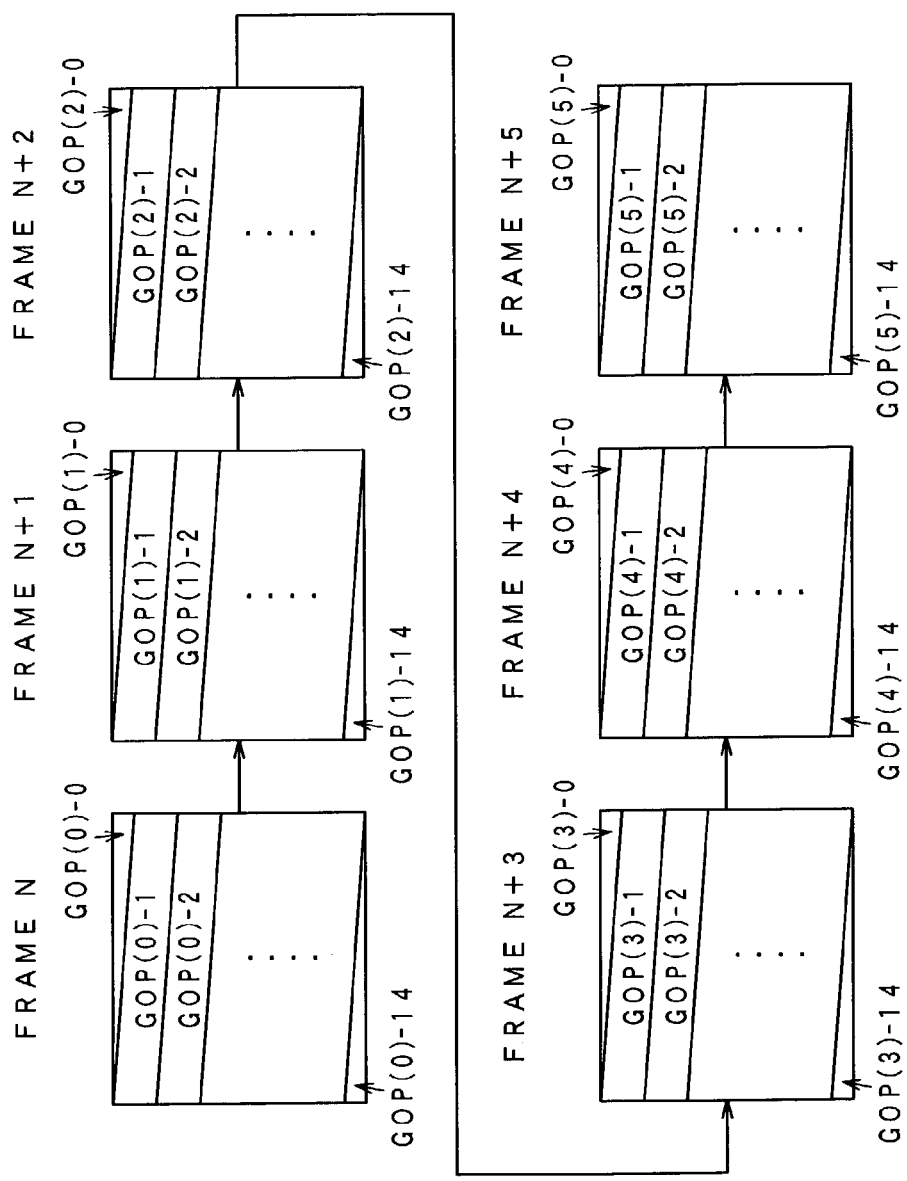
FIG. 19 schematically shows 15-tupled speed reproduction.

Referring to FIGS. 18 and 19, the operation of the data reproducing device 1 performing 15-tupled speed reproduction is hereinafter explained. FIG. 18 shows time changes of the media output, decoder output and the replay output with lapse of time. The memory space of the memory 53 has its row direction, shown in FIG. 17, divided into for example 225 (F0 to F224).

In FIGS. 18 and 19, the stamp video data, recorded on the optical disc OD, are shown in keeping with GOPs. Each GOP is composed of 15 frame units of stamp video data of frames 0 to 14, named GOP(i)-0 to GOP(i)-14, where i is 0, 1, 2, . . . , 14, . . . 59 . . .

When the user selects the 15-tupled speed reproduction via user interface 55, the system controller 47 controls the media controller 42 so that stamp video data of the 15 GOPs, totaling at 225 stamp video data, are read out by the reproducing driver 41 from the optical disc OD so as to be sequentially written in associated memory spaces of the memory 53.

FIGS. 18A and 18B show 15-GOP-based media output (a) issued from the optical disc OD to each memory space of the memory 53 within the time of decoding and reproduction and the decoded and reproduced output of the media output (b).

For example, the sum of 225 stamp video data of media output GOP(0) to GOP (14) are decoded and reproduced, in terms of frames, to which belong the constituent pixels (these frames corresponding to the frames N, N+1, N+2, ..., N+14 of FIG. 19), as a unit, as GOP(0)-0 to GOP(0)-14, GOP(1)-0 to GOP(1)-14, GOP(2)-0 to GOP(2)-14, GOP(3)-0 to GOP(3)-14, GOP(4)-0 to GOP(4)-14, GOP(5)-0 to GOP(5)-14, ..., GOP(14)-0 to GOP(14)-14.

The media output GOP(15) to GOP(29) are also decoded and reproduced, in terms of frames N, N+1, N+2, ..., N+14 as a unit, as GOP(15)-0 to GOP(15)-14, GOP(16)-0 to GOP (16)-14, GOP(17)-0 to GOP(17)-14, GOP(18)-0 to GOP(18)-14, GOP(19)-0 to GOP(19)-14, GOP(20)-0 to GOP(20)-14, ..., GOP(29)-0 to GOP(29)-14.

The stamp video data of GOP(30) to GOP(44) and GOP (45) to GOP(59) are also decoded and output in terms of the frame N, frame N+1, frame N+2, ..., frame N+14, as a unit.

FIG. 19 shows a specified example of decoded and reproduced outputs of the frames N, N+1, N+2, N+3, N+4 and N+5. That is, in the frame N, the GOP(0)-0, ... GOP(0)-14 are decoded, reproduced and displayed. In the frame N+1, the GOP(1)-0, ... GOP(1)-14 are decoded, reproduced and displayed. In the frame N+2, the GOP(2)-0, GOP(2)-14 are decoded, reproduced and displayed. In the frame N+3, the GOP(3)-0, ... GOP(3)-14 are decoded, reproduced and displayed. Similarly, in the frame N+4, the GOP(4)-0, ... GOP (4)-14 are decoded, reproduced and displayed, whereas, in the frame N+5, the GOP(5)-0, ... GOP(5)-14 are decoded, reproduced and displayed.

Thus, in the present specified example of the 15-tupled speed reproduction, the data reproducing device 1 is able to update picture frame display on the display device 2 portion-wise to discretely display the 15-frame picture information on one picture frame.

In general terms, if the user has specified the n-tupled speed, this data reproducing device 1 is able to make discrete display of n frames of the picture information on one picture frame so that the splitting line will be in the transverse direction. This allows the user to grasp search speed changes psycho-visually.

If stamp video data recorded by for example the intra-frame compression on the optical disc OD is used, it is possible for the data reproducing device 1 to achieve high-speed reproduction in the reverse direction, extremely readily, because no output sequence re-arraying is produced, such that it is possible to avoid the lowering of the response properties due to system delay or the increasing hardware cost brought about by the buffer memory.

With the present data reproducing device 1, it is possible, by employing the aforementioned stamp video data, to split the screen format extremely finely after a checkerboard pattern to achieve display in which each mosaic grid is updated sequentially. The system controller 47 of the data reproducing device 1 in this case is responsive to a re-arraying command from the user through a user interface 55 to supply an address, indicating from which location in the memory space rewriting is to be made to the stamp video decoder 44, as control signal.

The operation of the data reproducing device 1 writing five frames of the stamp video data in the memory 53 to sequentially update the mosaic is hereinafter explained. The memory space of the memory 53 is split into six, namely F0 to F5, as shown in FIG. 20.

Figure 20A:
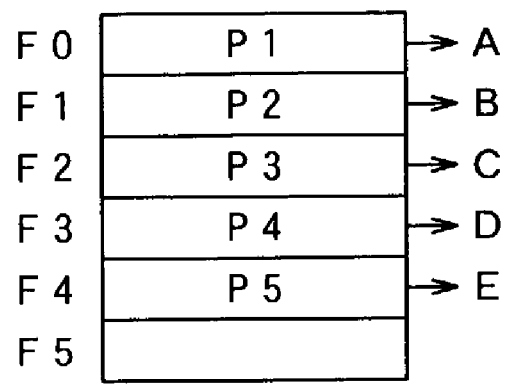
FIGS. 20A to 20C illustrate readout of stamp video data from a memory space during mosaic reproduction.

When the mosaic reproduction is selected by the user through a user interface 55, the system controller 47 controls the media controller 42 to cause the reproducing driver 41 to read out five stamp video data P1, P2, P3, P4 and P5 from the optical disc OD to write the data in the associated five memory spaces F0, F1, F2, F3 and F4 of the memory 53 on the frame basis, as shown in FIG. 20A.

Figure 21:
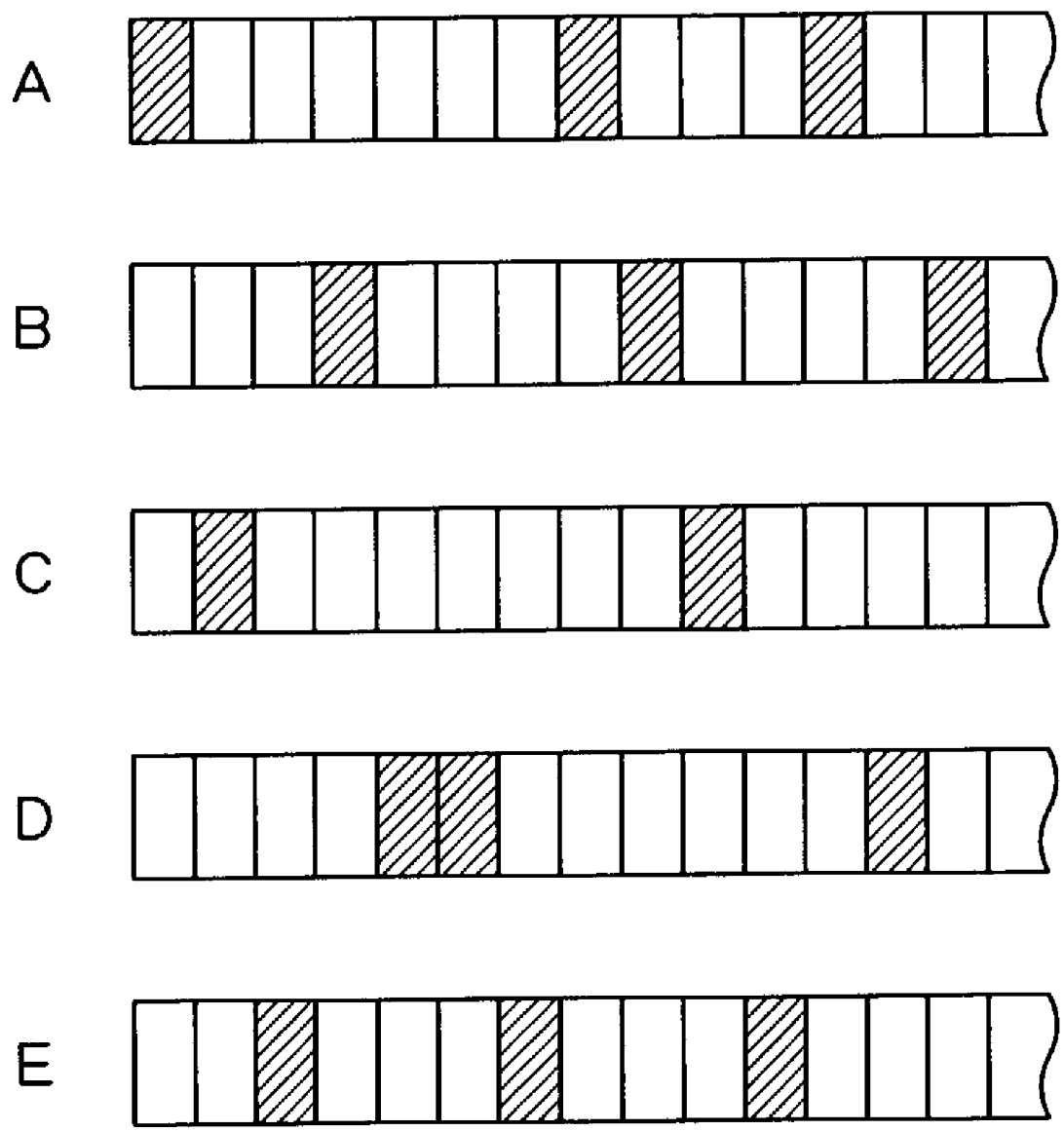
FIG. 21 shows a data readout pattern from stamp video data at the time of mosaic reproduction.
Figure 22:
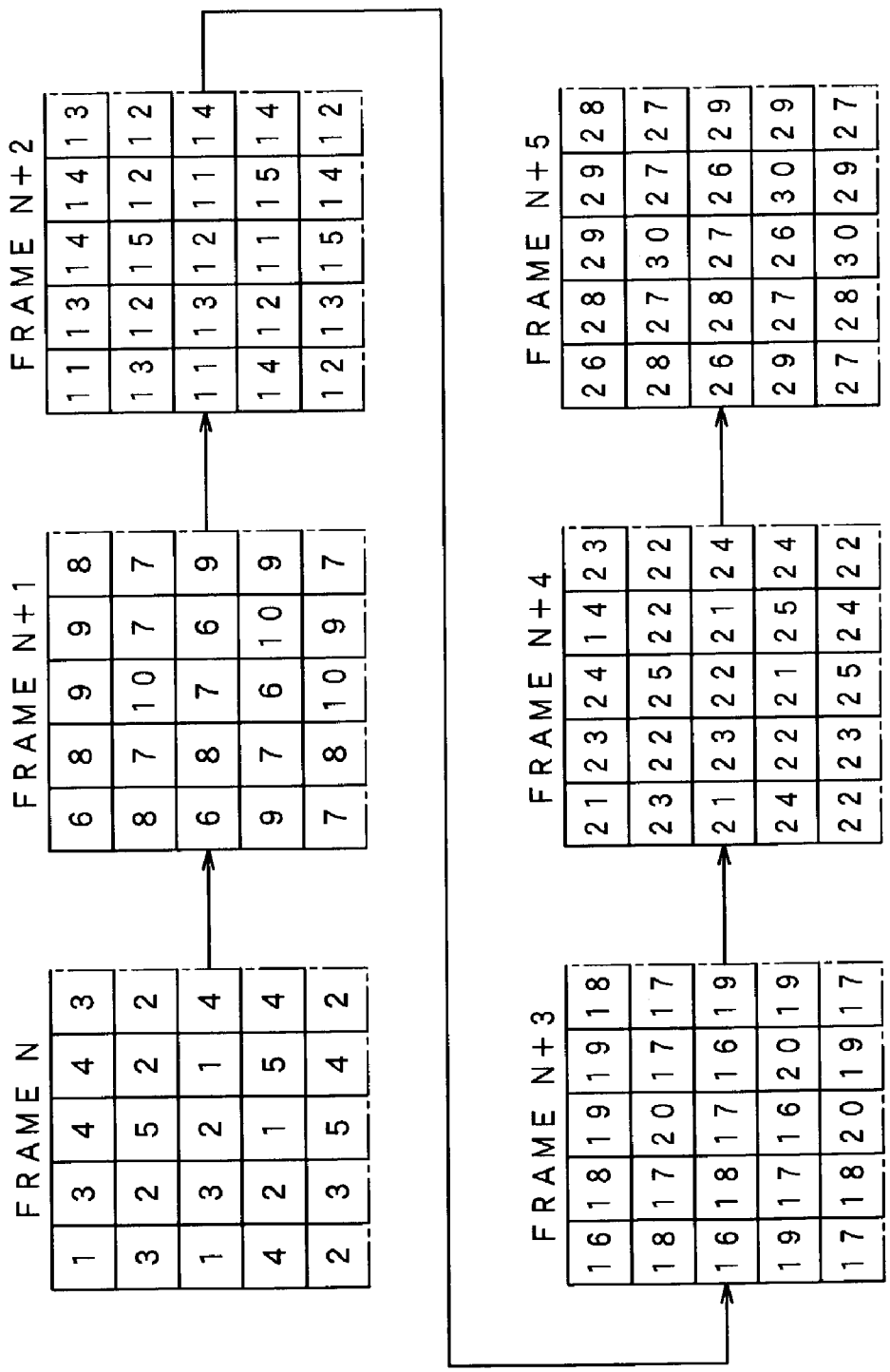
FIG. 22 shows display transition on a picture frame during mosaic reproduction.

The data reproducing device 1 reads out, decodes and reproduces data, in accordance with the patterns A, B, C, D and E, shown in FIG. 21, from the stamp video data P1, P2, P3, P4 and P5, written on the frame basis in the five memory spaces F0, F1, F2, F3 and F4 of the memory 53, as shown in FIG. 20A, to display the resulting data as frame N shown in FIG. 22. Of the numerical figures, indicated in FIG. 22, "1" shows a picture portion, read out and reproduced in accordance with a pattern A from the stamp video data P1, while "2" shows a picture portion, read out and reproduced in accordance with a pattern B from the stamp video data P2. Similarly, "3", "4" and "5" show picture portions, read out and reproduced in accordance with patterns C, D and E from the stamp video data P3, P4 and P5, respectively. Meanwhile, the patterns of FIG. 21 show portions of the entire patterns, while the frame-based reproduced results of FIG. 22 show portions of the entire reproduced results, as partially indicated with chain-dotted lines.

Figure 20B:
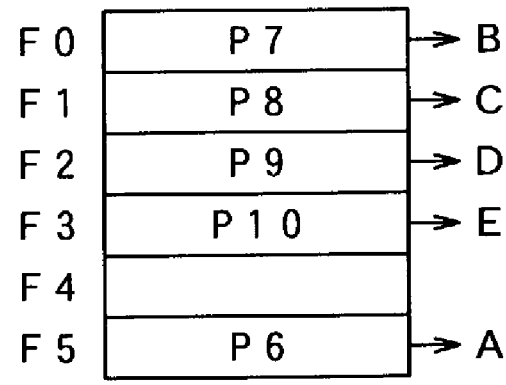

The five stamp video data P6, P7, P8, P9 and P10, read out from the optical disc OD, are written in the associated five memory spaces F5, F0, F1, F2 and F3 of the memory 53, on the frame basis, as shown in FIG. 20B. The data reproducing device 1 reads out these stamp video data in accordance with the patterns A to E for display as frame N+1 of FIG. 22. In this frame N+1 of FIG. 22, "6" shows a portion read out, decoded and reproduced from the stamp video data P6 in accordance with the pattern A. Similarly, "7" shows a portion read out, decoded and reproduced from the stamp video data P7 in accordance with the pattern B. Likewise, "8", "9" and "10" show picture portions read out, decoded and reproduced from the stamp video data P6, P7 and P8 in accordance with the patterns C, D and E, respectively.

Figure 20C:
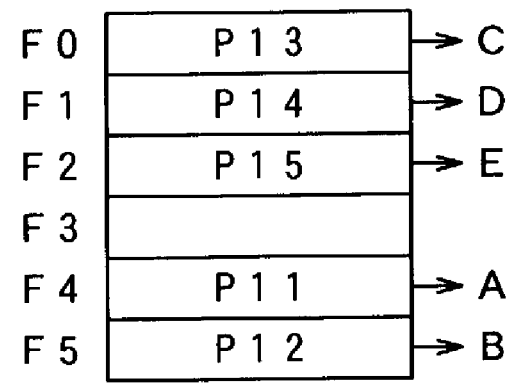

The five stamp video data P11, P12, P13, P14 and P15, read out from the optical disc OD, are written in associated five memory spaces F4, F5, F0, F1 and F2 of the memory 53, on the frame basis, respectively, as shown in FIG. 20C. The data reproducing device 1 reads out, decodes and reproduces these stamp pattern data in accordance with the patterns A, B, C, D and E to display the data as the frame N+2 of FIG. 22. In this frame N+2 of FIG. 22, "11" shows a portion read out, decoded and reproduced from the stamp video data P11 in accordance with the pattern A. Similarly, "12" shows a portion read out, decoded and reproduced from the stamp video data P12 in accordance with the pattern B. Likewise, "13", "14" and "15" shows picture portions read out, decoded and reproduced from the stamp video data P13, P14 and P15 in accordance with the patterns C, D and E, respectively.

The five stamp video data, read out from the optical disc OD, are read out, decoded and reproduced, in accordance with the patterns A, B, C, D and E, as the video data are written in the associated five memory spaces of the memory 53. The data so reproduced are demonstrated in mosaics as shown at frames N+3, N+4 and N+5 in FIG. 22.

Figure 23:
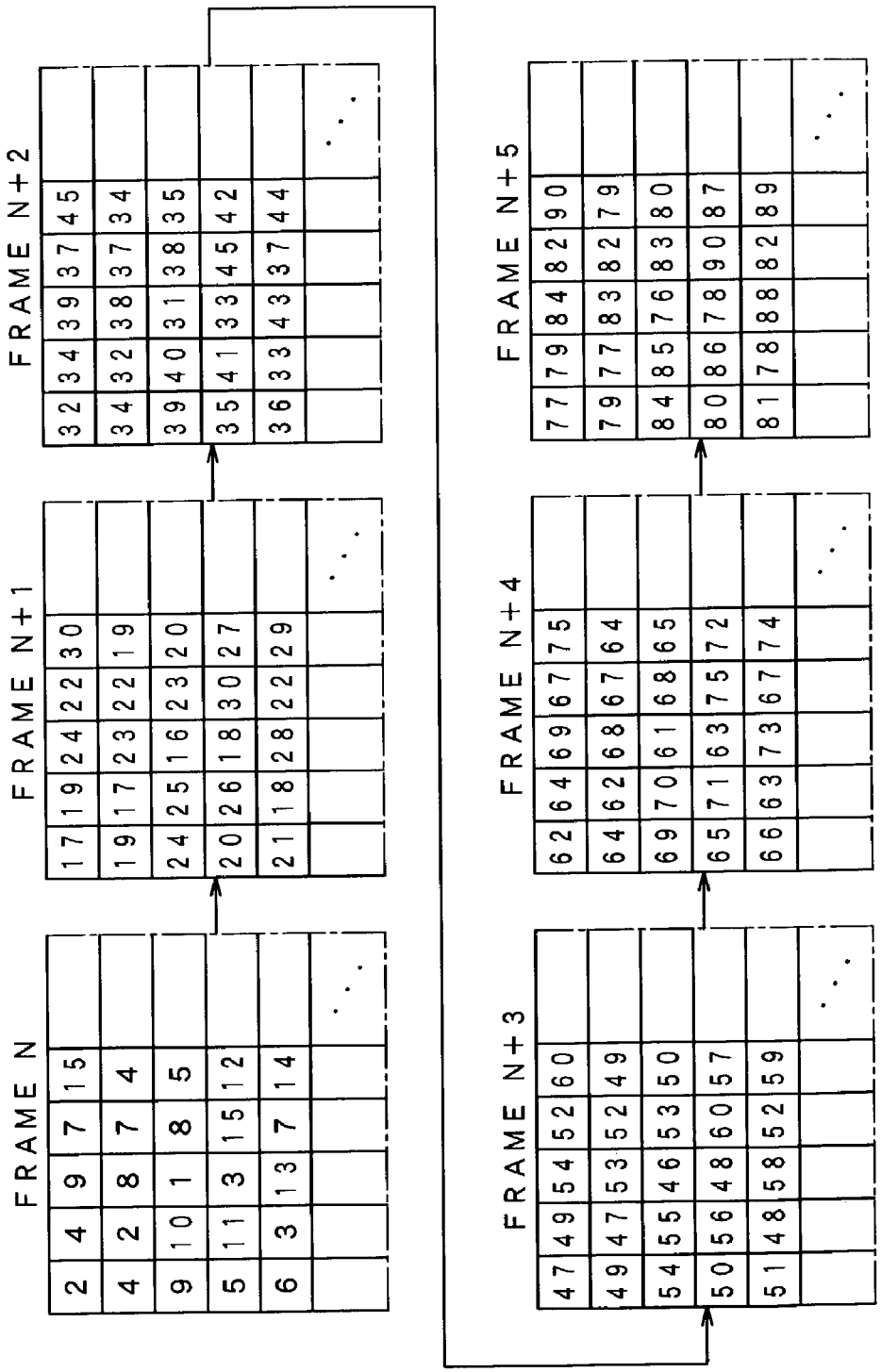
FIG. 23 shows display transition on a picture frame during mosaic reproduction.
Figure 24:
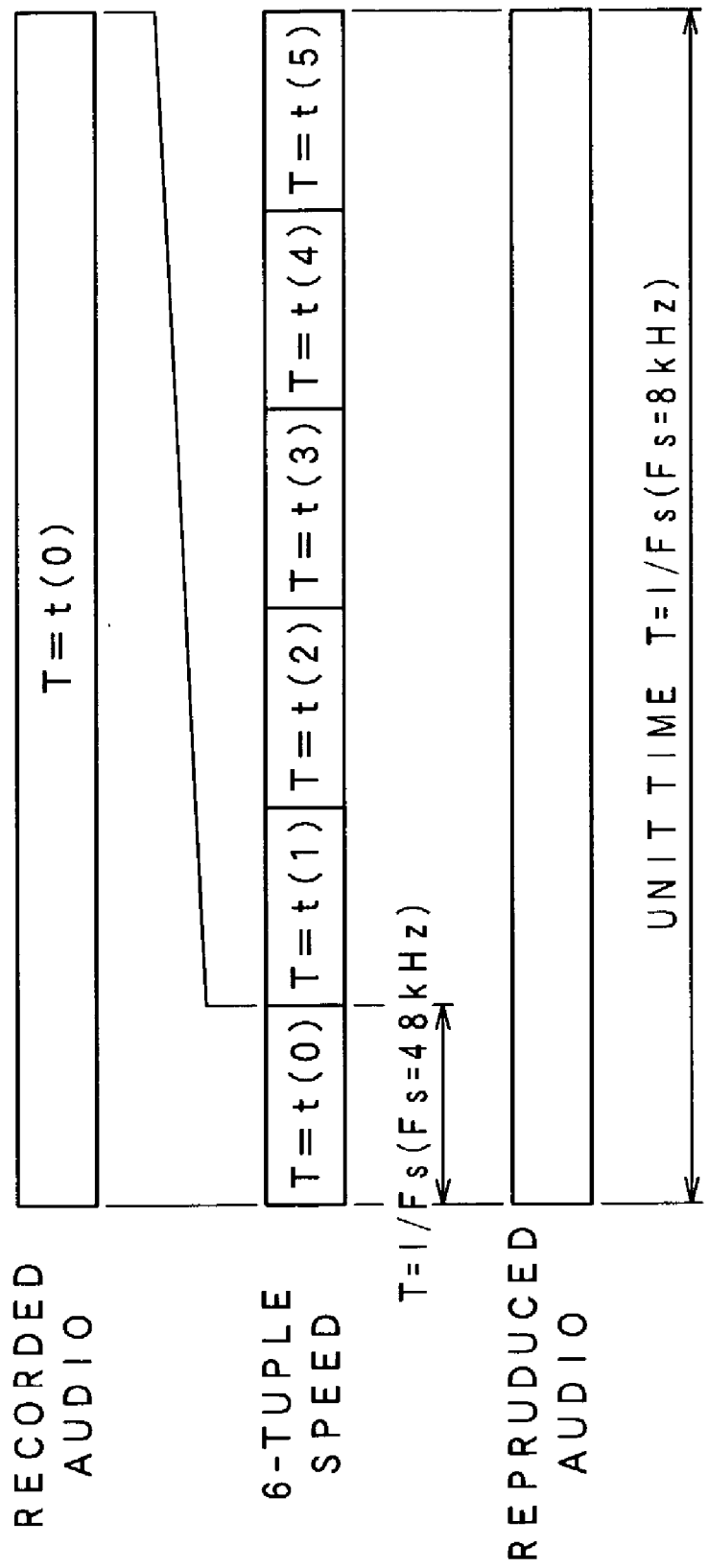
FIG. 24 is a timing chart for illustrating 6-tupled speed reproduction employing stamp audio data by a data reproducing device.
Figure 25:
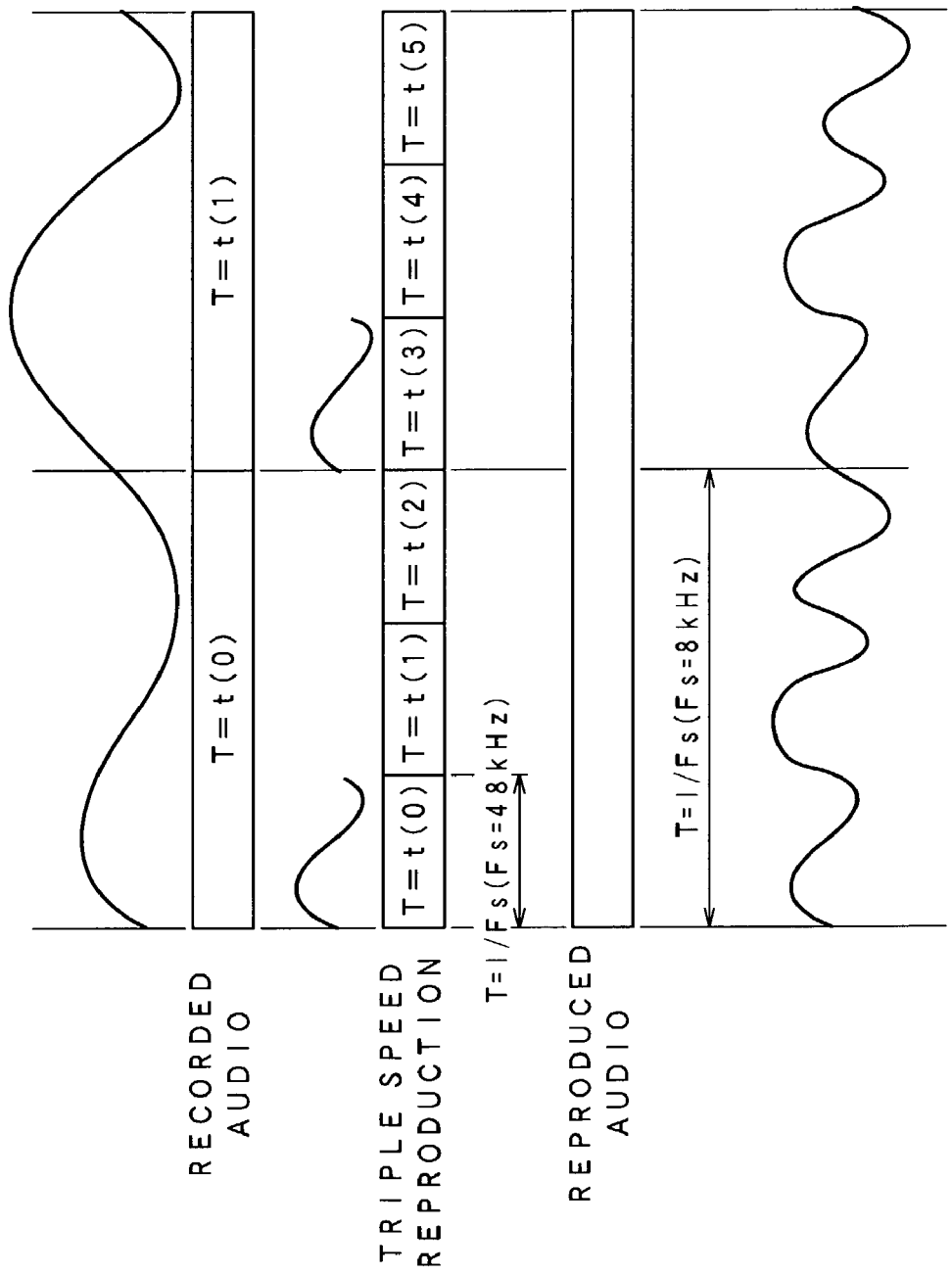
FIG. 25 is a timing chart for illustrating triple speed reproduction employing stamp audio data by a data reproducing device.

The display transition in which the data reproducing device 1 writes 15 frames of the stamp video data in the memory 53 and the mosaic is sequentially updated is shown in FIG. 23.

The data reproducing device 1 is able to read out, decode and reproduce frame-based stamp video data, written in the memory spaces, split into for example 225 in the row direction, in accordance with 15 patterns, to make such display in which the mosaic is sequentially updated, as frame N, frame N+1, . . . frame N+5, as shown in FIG. 23.

The high speed reproducing operation of the speech information in the data reproducing device 1 is hereinafter explained. If, in the data reproducing device 1, shown in FIG. 7, the user commands video reproduction at for example 6-tupled speed, via user interface 55, 6-tupled speed reproduction, employing the stamp audio data, accompanied by the stamp video data, occurs in the data reproducing device 1. First, the system controller 47 generates a 6-tupled speed reproduction control signal and sends the resulting signals to the VAR SRC 54. The system controller 47 also generates a stamp audio switching control signal to send the so generated signal to the reproduction switching controller 45. The system controller 47 also is able to operate if, apart from the high speed reproduction of the stamp video data, high speed reproduction only of the stamp audio data is commanded by the user.

The stamp audio decoder 46 log-decompresses the stamp audio data of Fs=8 kHz and 8 bits to Fs=8 kHz and 16 bits to send the resulting data to the VAR SRC 54.

The VAR SRC 54 converts the sampling frequency Fs=8 kHz to 48 kHz. This gives the speech with the pitch of ⅙ on conversion to analog audio signals.

Since the reproduction is 6-tupled speed reproduction, the data reproduced per unit time (1/Fs:Fs=8 kHz). The time interval is ⅙, which is equivalent to sampling at 6-tupled Fs. Thus, the VAR SRC 54 converts the sampling frequency Fs=8 kHz to 48 kHz to allow to reproduce the speech with a pitch of ⅙, that is the speech shifted to a high range of the 6-tupled speed. In general, in N-tupled reproduction, where N≦6, it is possible to reproduce the sound shifted to a high range of N-tupled speed reproduction by converting Fs=8*N kHz to Fs=48 kHz.

For example, in reproduction with N=triple speed, it is possible to reproduce the sound shifted to a high range of the pitch of ⅓. No discontinuities are produced because there are present the entire data.

Thus, in the data reproducing device 1, the speech signals of the low sampling rate are used for high speed reproduction. Since the entire data may be reproduced, the sound shifted to the high range side can be output, as in the case of the longitudinal track of the analog VTR, by converting the sampling frequency of the data in dependence upon the reproducing speed, thus enabling retrieval with the search speech equivalent to the analog VTR.

Of course, if it is attempted to use this method in the high speed search of N>6, the sampling rate becomes too low, so that the reproducible bandwidth is narrowed and hence it is difficult to provide the search of sufficient quality. However, since the contents of the sound shifted to the high range can be discerned up to several tupled speed at most, routine methods may be used for reproduction at a higher speed in place of the above-described method with a view to recognition only of the presence or non-presence of the speech. Notwithstanding, the search performance by speech can sufficiently be improved in the practical range.

Figure 26:
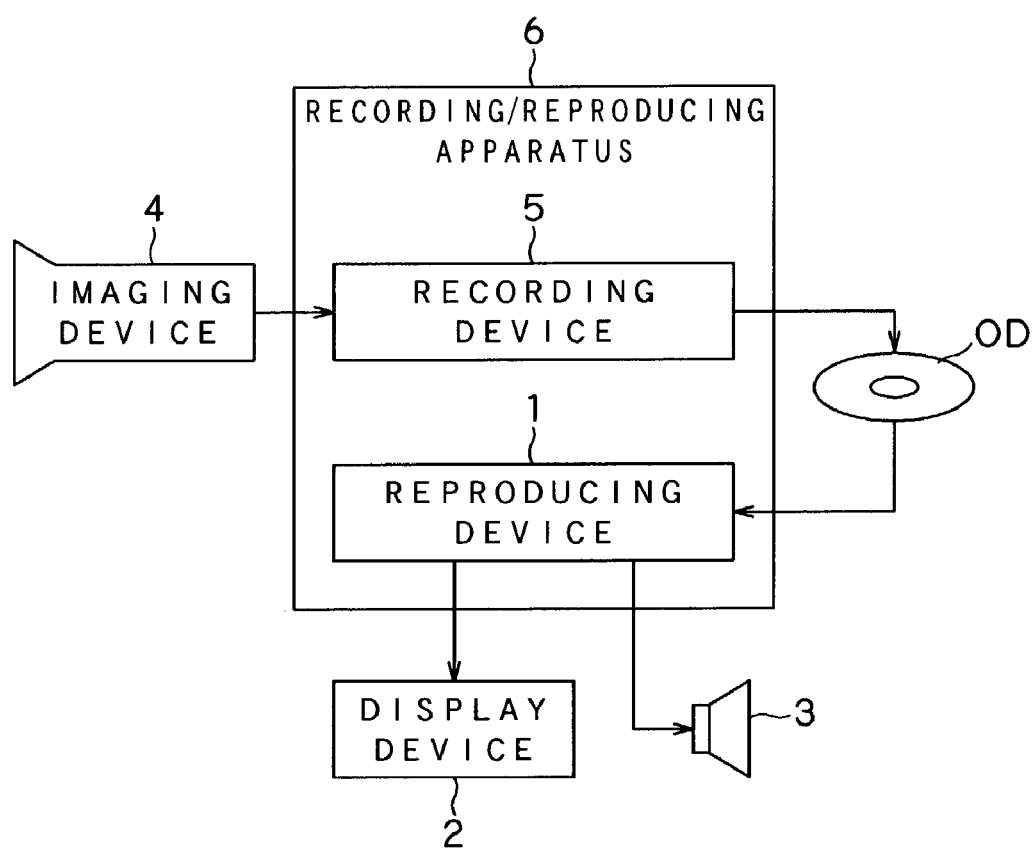
FIG. 26 is a block diagram showing an instance of application of a data recording and/or reproducing apparatus as a second embodiment of the present invention.

A second embodiment of the present invention is now explained. The present second embodiment is directed to a data recording and/or reproducing apparatus 6 having the data recording device 5 and the data reproducing device 1, as shown in FIG. 26. To the data reproducing device I are connected the display device 2 and the loudspeaker 3.

Figure 27:
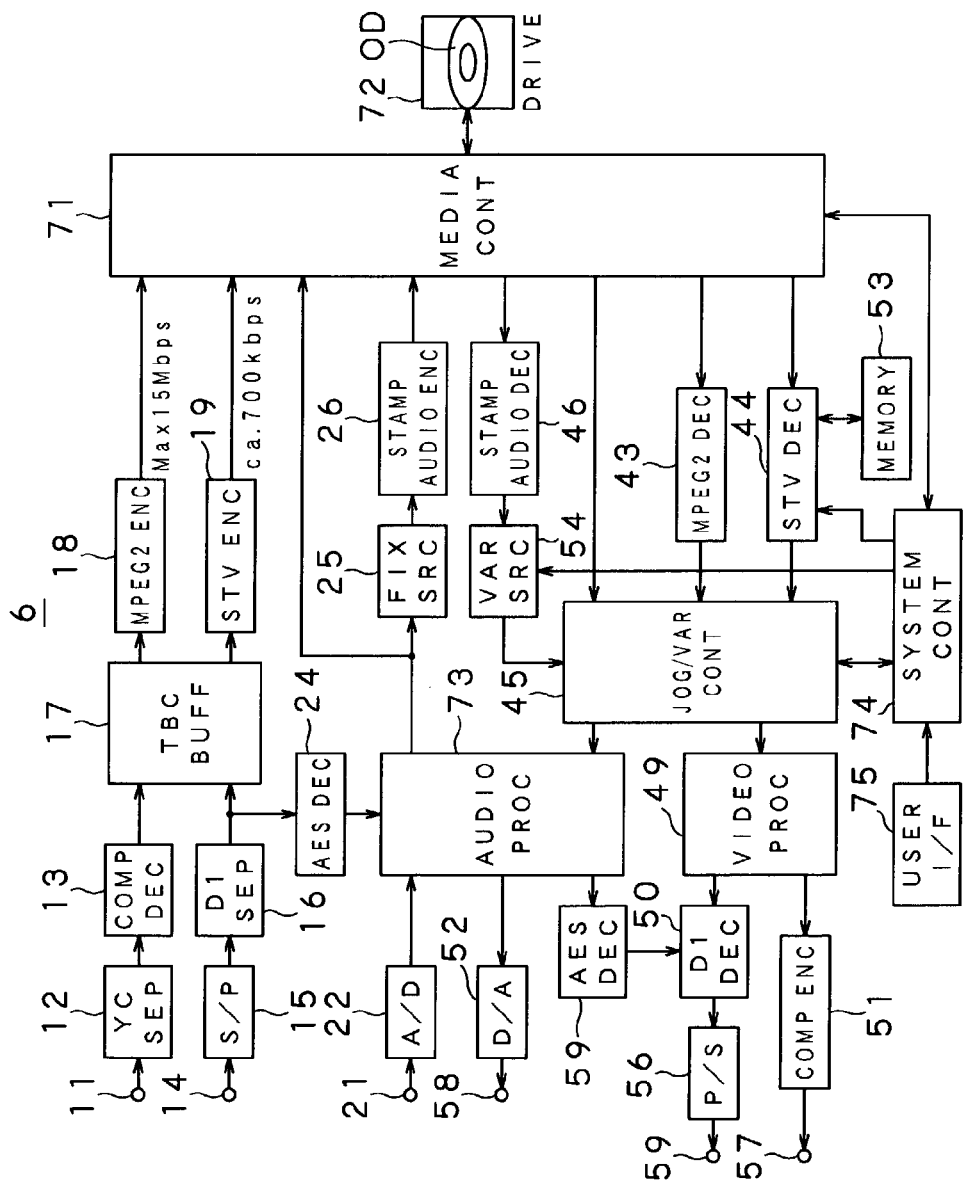
FIG. 27 is a block diagram showing a structure of a data recording and/or reproducing apparatus.

The configuration of this data recording and/or reproducing apparatus 6, shown in FIG. 27, is comprised of the data recording device 5 shown in FIG. 2 and the data reproducing device 1 shown in FIG. 7. A media controller 71, a recording and/or reproducing driver 72, an audio process controller 73, a system controller 74 and a user interface 75 are adapted for performing both the recording and reproducing operations. Other portions are as explained previously and hence are not explained for simplicity.

In this data recording and/or reproducing apparatus 6, the picture information of 5 frames or 15 frames may be displayed on a picture frame, depending on the current high speed reproducing modes of 5-tupled speed reproduction or 15-tupled speed reproduction, as an example, as specified by the user. Consequently, the user is able to grasp the changes in the reproducing speed psycho-visually, as a result of which the high speed search retrieval performed in a picture can comprehensibly be improved.

Moreover, with the present data recording and/or reproducing apparatus 6, stamp video data are recorded in a region distinct from the region for the MPEG2 video data on the optical disc OD and used, with the stamp video data being of the low rate of approximately 700 kbps to enable high speed reproduction in the reverse direction extremely readily. The reason is that no outputting sequence re-arraying occurs such that it is possible to avoid delay in response characteristics otherwise caused by system delay as well as to avoid the increasing hardware cost by the buffer memory.

With the present data recording and/or reproducing apparatus 6, the use of the above-mentioned stamp video data allows to split the picture frame finely like gridiron of a checkerboard pattern to provide for display in which the mosaic is updated sequentially.

Moreover, with this data recording and/or reproducing apparatus 6, it is possible in N-tupled speed reproduction (N≦6) to reproduce the sound shifted to a high range of N-tupled speed reproduction by converting Fs=8*NkHz to Fs=48 kHz.

In the above-described respective embodiments, an optical disc is used as a specified example of the non-linear accessible recording medium, a magneto-optical disc, a magnetic disc or a semiconductor memory may, of course, be used.

Although the above-described data reproducing device 1 employs stamp video data in need of decoding, it is of course unnecessary to execute such decoding if the low rate video data is generated by decimation or interpolation.

In the above-described embodiments, the high rate video data is the MPEG2 employing interframe compression, while the low rate video data is stamp video data employing intra-frame compression. However, it is possible to use any suitable video data of the high rate and those of the low rate. That is, it is sufficient that the time needed in reproduction including readout from the recording medium and if necessary decoding is shorter for the low rate video data than that for the high rate video data. The same applies for audio data.

While the invention has been described in accordance with certain preferred embodiments thereof illustrated in the accompanying drawings and described in the above description in detail, it should be understood by those ordinarily skilled in the art that the invention is not limited to the embodiments, but various modifications, alternative constructions or equivalents can be implemented without departing from the scope and the spirit of the present invention as set forth and defined in the appended claims.

What is claimed is:

1. A data processing apparatus comprising:
    a reader for reading data recorded on a non-linear accessible recording medium having recorded thereon video data including high rate video data and low rate video data for the same material, wherein a data volume of low rate video data read per unit time is larger than that of the high rate video data; and an output data generator;

said output data generator causing said reader to read out said low rate video data from said recording medium while simultaneously performing reproduction of high speed video data, forming respective frames of output video data so that a predetermined plural number of said low rate video data are displayed at least portion-wise in one and the same frame, and updating the respective frames of said output video data portion-wise with said low rate video data read out by said reader for each of said respective frames of said output video data, wherein the low rate video data is read out instead of the high rate video data when reproducing high speed video data, and wherein the time period for reproduction of the low rate video data including readout and decoding from the non linear recording medium is shorter than the time period for reproduction of the high rate video data including readout and decoding from the non linear recording medium.

2. The data processing apparatus as recited in claim 1 wherein said output data generator at the time of said high speed reproduction mode memorizes said predetermined plural number of frames of the low rate video data as read by said reader in a memory and combines different portions of said low rate video data of said predetermined plural number of frames of the low rate video data by reading said different portions from said memory for each frame of said output video data so that said output video data are updated portion-wise for each frame of said output video data.

3. The data processing apparatus as recited in claim 1 wherein said recording medium has recorded thereon high rate audio data and low rate audio data associated with said video data, in addition to said video data; and wherein said output data generator at the time of said high speed reproduction mode causes said reader to read said low rate audio data from said recording medium to convert sampling frequency of said low rate audio data.

4. The data processing apparatus as recited in claim 1 further comprising a recorder for recording data on said recording medium.

5. A data processing apparatus comprising:

readout means for reading data recorded on a non-linear accessible recording medium having recorded thereon video data including high rate video data and low rate video data for the same material, wherein a data volume of low rate video data read per unit time is larger than that of the high rate video data; and output data generating means;

said output data generating means causing said readout means to read out said low rate video data from said recording medium while simultaneously performing reproduction of high speed video data, forming respective frames of output video data so that a predetermined plural number of said low rate video data are displayed at least portion-wise in one and the same frame, and updating the respective frames of said output video data portion-wise with said low rate video data read out by said readout means for each of said respective frames of said output video data, wherein the low rate video data is read out instead of the high rate video data when reproducing high speed video data, and wherein the time period for reproduction of the low rate video data including readout and decoding from the non linear recording medium is shorter than the time period for reproduction of the high rate video data including readout and decoding from the non linear recording medium.

6. The data processing apparatus as recited in claim 5 wherein said output data generating means at the time of said high speed reproduction mode memorizes said predetermined plural number of the low rate video data as read by said readout means in a memory and combines different portions of said low rate video data of said predetermined plural number of frames of the low rate video data by reading said different portions from said memory for each frame of said output video data so that said output video data are updated portion-wise for each frame of said output video data.

7. The data processing apparatus as recited in claim 5 wherein said recording medium has recorded thereon high rate audio data and low rate audio data associated with said video data, in addition to said video data; and wherein said output data generating means at the time of said high speed reproduction mode causes said readout means to read said low rate audio data from said recording medium to convert sampling frequency of said low rate audio data.

8. The data processing apparatus as recited in claim 5 further comprising recording means for recording data on said recording medium.

* * * * *